(12) United States Patent
Hwang et al.

(10) Patent No.: US 10,904,637 B2
(45) Date of Patent: Jan. 26, 2021

(54) EMBEDDED RENDERING ENGINE FOR MEDIA DATA

(71) Applicant: QUALCOMM Incorporated, San Diego, CA (US)

(72) Inventors: Hau Hwang, San Diego, CA (US); Jisoo Lee, San Jose, CA (US); Jiafu Luo, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/222,885

(22) Filed: Dec. 17, 2018

(65) Prior Publication Data

US 2020/0196024 A1    Jun. 18, 2020

(51) Int. Cl.
| | |
|---|---|
| H04N 7/173 | (2011.01) |
| H04N 21/6547 | (2011.01) |
| G06N 3/04 | (2006.01) |
| G06N 3/08 | (2006.01) |
| H04N 21/235 | (2011.01) |
| H04N 21/443 | (2011.01) |
| H04N 21/84 | (2011.01) |

(52) U.S. Cl.
CPC ........... *H04N 21/6547* (2013.01); *G06N 3/04* (2013.01); *G06N 3/084* (2013.01); *H04N 21/2353* (2013.01); *H04N 21/443* (2013.01); *H04N 21/84* (2013.01)

(58) Field of Classification Search
CPC .............. H04N 21/6547; H04N 21/84; H04N 21/2353; H04N 21/443
USPC ........................................................ 725/116
See application file for complete search history.

(56) References Cited

U.S. PATENT DOCUMENTS

| | | | | |
|---|---|---|---|---|
| 7,614,069 B2* | 11/2009 | Stone | ..................... | H04N 5/765 |
| | | | | 725/87 |
| 7,813,822 B1* | 10/2010 | Hoffberg | ............ | G06K 9/00369 |
| | | | | 381/73.1 |
| 8,032,911 B2* | 10/2011 | Ohkita | .................. | H04L 12/282 |
| | | | | 370/402 |

(Continued)

FOREIGN PATENT DOCUMENTS

| | | |
|---|---|---|
| CN | 108062780 A | 5/2018 |
| WO | 2018150083 A1 | 8/2018 |

OTHER PUBLICATIONS

International Search Report and Written Opinion—PCT/US2019/066397—ISA/EPO—dated Mar. 2, 2020.

*Primary Examiner* — Michael B. Pierorazio
(74) *Attorney, Agent, or Firm* — Polsinelli LLP

(57) ABSTRACT

Techniques and systems are provided for providing a rendering engine model for raw media data. In some examples, a system obtains media data captured by a data capturing device and embeds, in a media item containing the media data, a rendering engine model including a description of a neural network configured to process the media data and generate a particular media data output, the description defining a neural network architecture for the neural network. The system then outputs the media item with the rendering engine model embedded in the media item, the rendering engine model indicating how to execute the neural network to process the media data in the media item and generate the particular media data output based on the description of the neural network.

31 Claims, 9 Drawing Sheets

(56) References Cited

U.S. PATENT DOCUMENTS

| | | | |
|---|---|---|---|
| 8,121,706 B2* | 2/2012 | Morikawa | H04L 12/2814 340/4.3 |
| 8,346,755 B1 | 1/2013 | Kapoor et al. | |
| 8,612,847 B2 | 12/2013 | Sorotokin et al. | |
| 8,797,330 B1 | 8/2014 | Haase et al. | |
| 8,949,923 B2* | 2/2015 | Muvavarirwa | H04N 21/43615 725/139 |
| 9,852,113 B2 | 12/2017 | Chakra et al. | |
| 2003/0056093 A1* | 3/2003 | Huitema | H04L 29/12009 713/156 |
| 2004/0117856 A1* | 6/2004 | Barsoum | H04N 21/235 725/138 |
| 2005/0216942 A1* | 9/2005 | Barton | H04N 7/17318 725/97 |
| 2005/0283815 A1* | 12/2005 | Brooks | H04H 20/78 725/126 |
| 2005/0289632 A1* | 12/2005 | Brooks | H03H 7/461 725/126 |
| 2006/0010481 A1* | 1/2006 | Wall | H04N 7/163 725/151 |
| 2006/0212197 A1* | 9/2006 | Butler | B60R 11/0235 701/36 |
| 2006/0225105 A1* | 10/2006 | Russ | H04N 7/17318 725/78 |
| 2007/0050822 A1* | 3/2007 | Stevens | H04N 7/14 725/74 |
| 2007/0079341 A1* | 4/2007 | Russ | H04L 12/2805 725/89 |
| 2007/0101185 A1* | 5/2007 | Ostrowka | H04N 21/4821 714/6.13 |
| 2007/0130601 A1* | 6/2007 | Li | H04L 12/18 725/112 |
| 2007/0157281 A1* | 7/2007 | Ellis | H04N 7/17309 725/134 |
| 2008/0013919 A1* | 1/2008 | Boston | G11B 19/00 386/291 |
| 2008/0022330 A1* | 1/2008 | Barrett | H04N 7/163 725/89 |
| 2008/0022331 A1* | 1/2008 | Barrett | H04N 7/163 725/89 |
| 2008/0022332 A1* | 1/2008 | Barrett | H04H 20/63 725/89 |
| 2008/0155615 A1* | 6/2008 | Craner | H04N 5/765 725/91 |
| 2008/0235587 A1* | 9/2008 | Heie | H04N 7/142 715/719 |
| 2008/0235733 A1* | 9/2008 | Heie | H04N 7/163 725/46 |
| 2009/0162032 A1* | 6/2009 | Patel | H04N 7/17318 386/252 |
| 2010/0107186 A1* | 4/2010 | Varriale | H04H 60/23 725/31 |
| 2010/0263013 A1* | 10/2010 | Asakura | H04N 21/4333 725/116 |
| 2010/0296487 A1* | 11/2010 | Karaoguz | H04W 84/045 370/332 |
| 2010/0313226 A1* | 12/2010 | Cholas | H04N 7/17318 725/92 |
| 2011/0066744 A1* | 3/2011 | Del Sordo | H04N 21/235 709/231 |
| 2011/0086619 A1* | 4/2011 | George | H04M 1/72533 455/414.1 |
| 2011/0107379 A1* | 5/2011 | Lajoie | H04L 65/1023 370/389 |
| 2011/0191810 A1* | 8/2011 | Thomas | H04N 7/106 725/81 |
| 2012/0230649 A1* | 9/2012 | Craner | G11B 19/00 386/230 |
| 2013/0198787 A1* | 8/2013 | Perry, II | H04N 21/25816 725/86 |
| 2015/0382081 A1 | 12/2015 | Reese et al. | |
| 2017/0109584 A1* | 4/2017 | Yao | G06K 9/00718 |
| 2017/0185871 A1 | 6/2017 | Zhang et al. | |
| 2018/0150704 A1* | 5/2018 | Lee | G06K 9/4628 |
| 2018/0253869 A1 | 9/2018 | Yumer et al. | |
| 2018/0260997 A1 | 9/2018 | Petkov et al. | |
| 2019/0108618 A1* | 4/2019 | Hwang | G06N 3/0454 |
| 2019/0206091 A1 | 7/2019 | Weng | |
| 2019/0222891 A1* | 7/2019 | Shen | G06F 21/32 |

\* cited by examiner

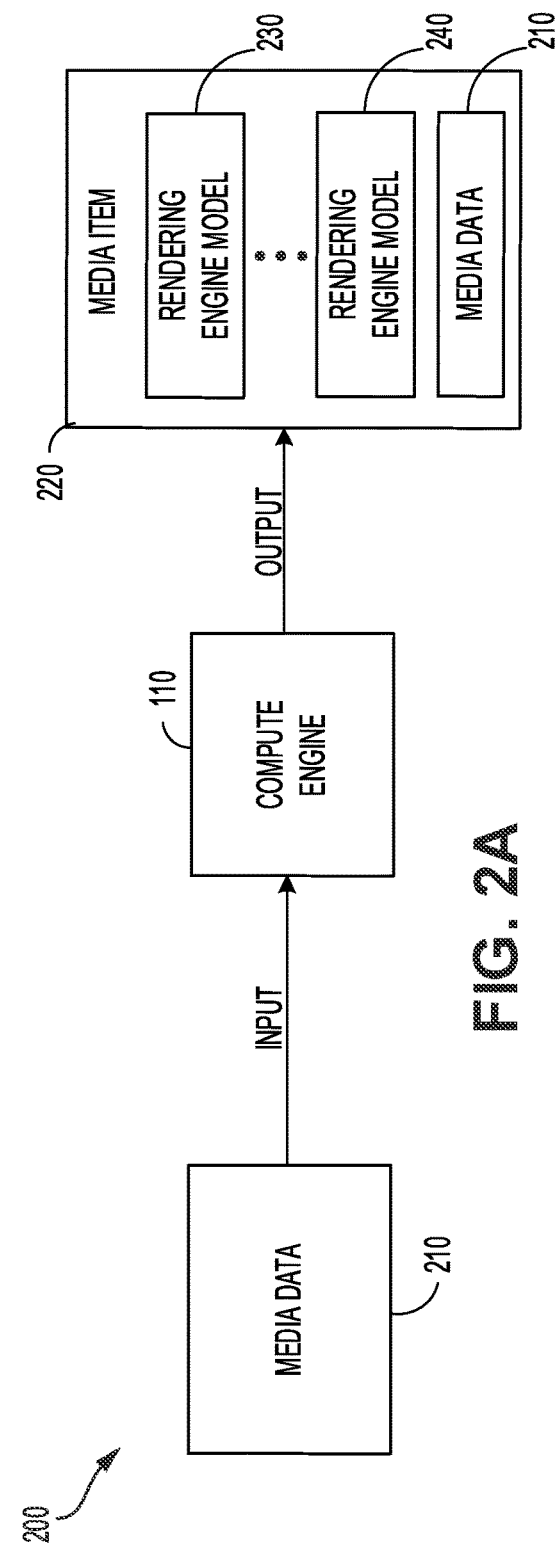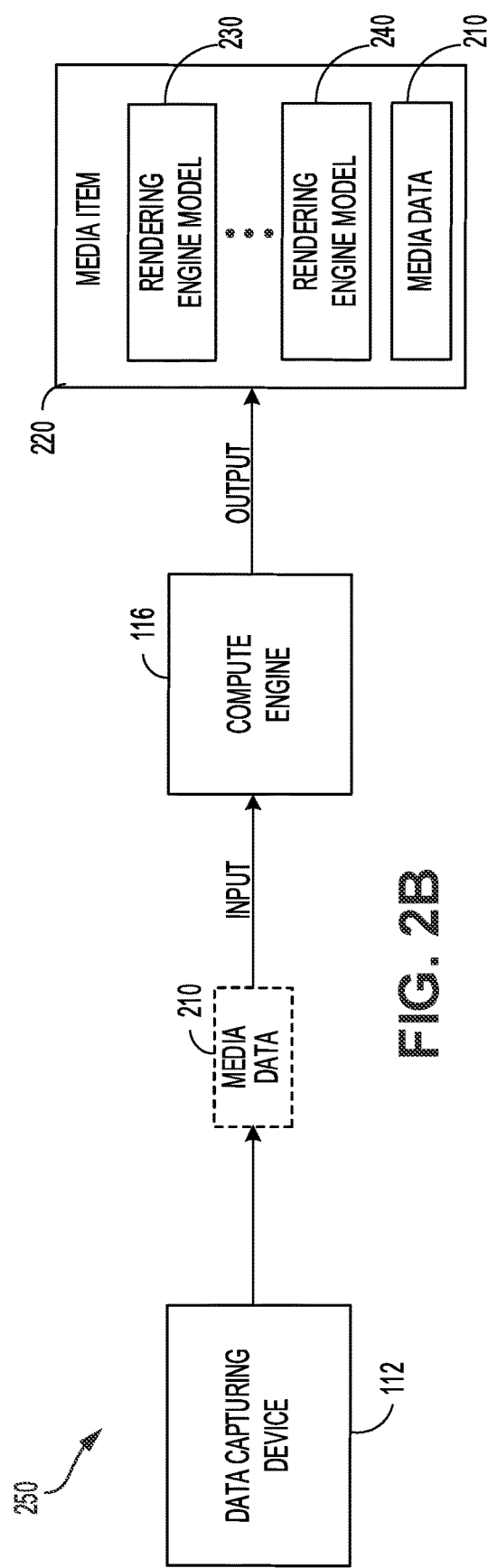

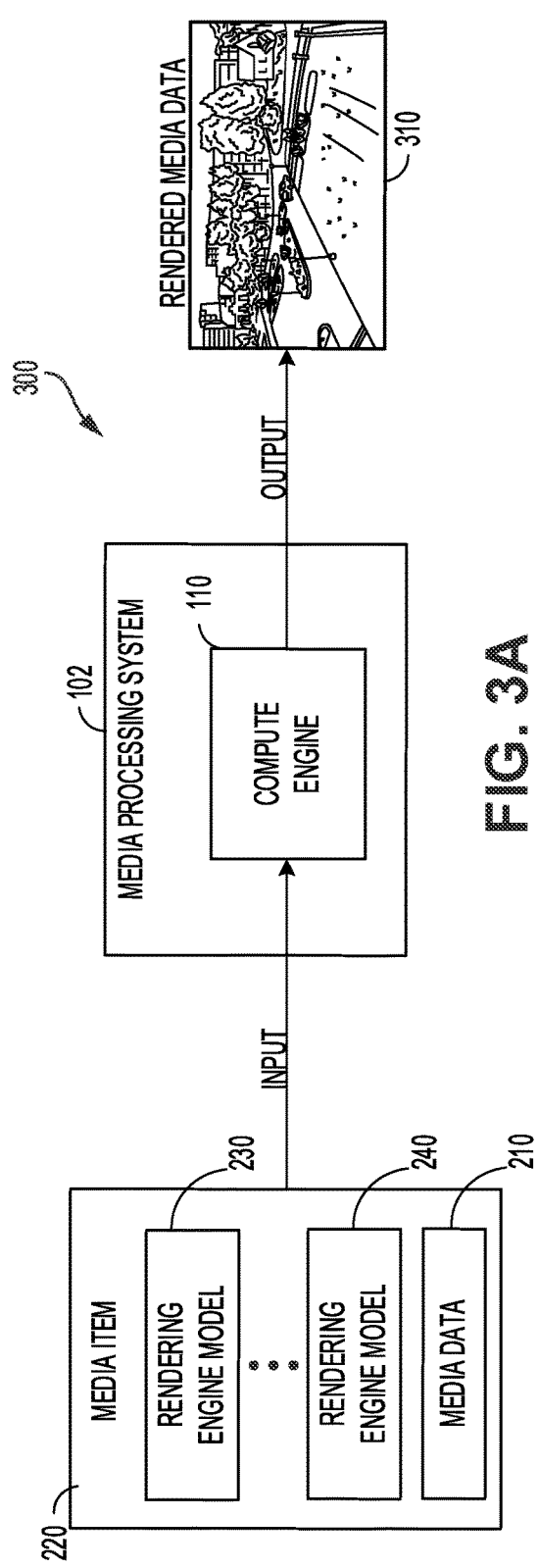
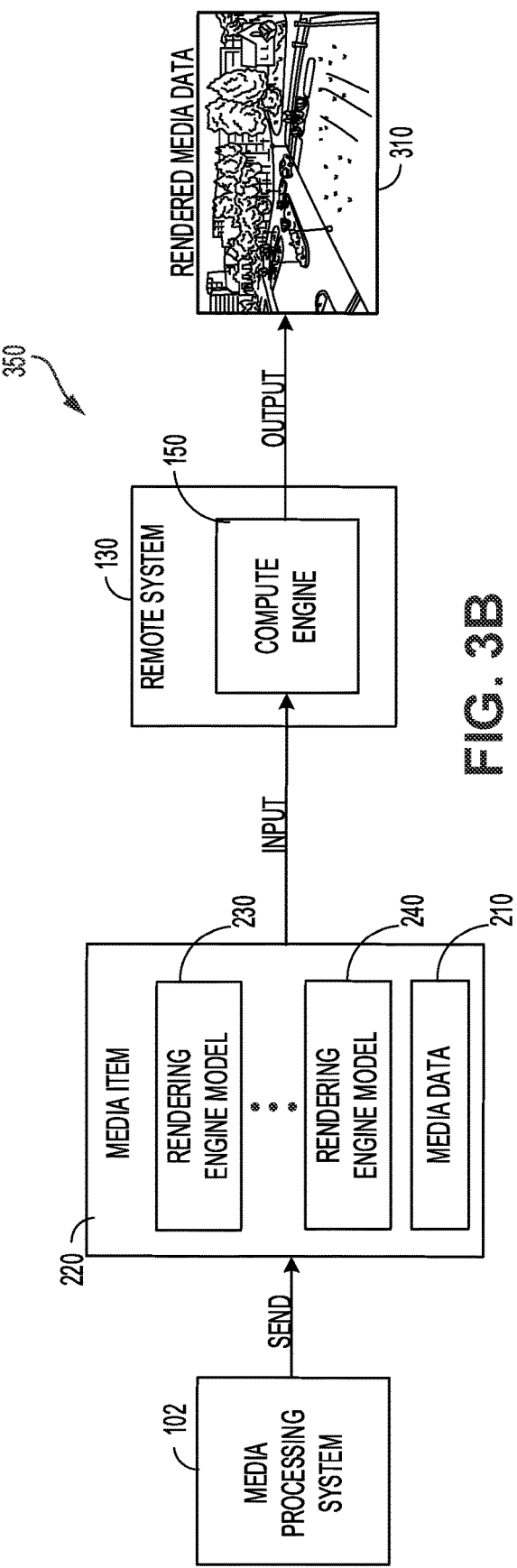

EMBEDDED RENDERING ENGINE FOR MEDIA DATA

TECHNICAL FIELD

The present disclosure generally relates to media rendering, and more specifically to embedding rendering engine models with media items for rendering of raw media data in the media items.

BACKGROUND

The increasing versatility of media data capturing products, such as digital cameras and microphones, has allowed media capturing capabilities to be integrated into a wide array of devices. Users can capture video, images, and/or audio from any device equipped with such media capturing capabilities. The video, images, and audio can be captured for recreational use, professional use, surveillance, and automation, among other applications. The media capturing devices can capture raw media data, such as raw image or audio data, and generate files or streams containing the raw media data. To render the raw media data in a file or stream, a separate rendering engine, such as a decoder, suitable for that specific file or stream is necessary. For example, a video decoder is necessary to render and view content in a video file and an image decoder is necessary to render and view content in an image file. Such rendering engines are able to understand, process and render the raw media data in files or streams.

There is a wide assortment of formats and types of files for media data, as well as software tools for rendering the different types of files. The different files have different requirements, specifications, and behavior, and are only compatible with some media software tools. If a user wants to render a particular media file on a device, the user needs to have media software suitable for that media file installed on the device. Unfortunately, in many cases, the user's device may not have the necessary media software for a particular media file. As a result, users are frequently unable to render media files on their device unless they are able to find and install the necessary media software for each media file they want to render. The process can be frustrating, often preventing a user's access to media content, hindering the user's media content experience, or forcing users to find and install suitable media software each time they wish to render a media file that is incompatible with the software on their device. The compatibility issues caused by the different types of media files available has prompted various efforts to increase interoperability through standardization. However, standardization can be onerous, leading to a lengthy and complicated process when adding new media capabilities and features.

BRIEF SUMMARY

The technologies described herein can be implemented to create media items, such as media files or streams, containing raw or captured media data (e.g., image data, video data, audio data, etc.) and a full specification of a rendering engine for the raw media data. The rendering engine model can be embedded in the media items along with the raw media data. The rendering engine models in the media items allow devices to process and render the raw media data without a separate media rendering tool (e.g., a decoder, an encoder, an image processor, a neural network processor, and/or other media rendering tool). The media items are thus pre-equipped with the tools for rendering the raw media data regardless of the type or format of the media items, thereby avoiding the frustrating compatibility issues that commonly occur when attempting to render different types of media items. Based on the rendering engine models in the media items, a user can run a rendering engine defined for the media data and render the media data from the user's device without first having to ensure that the device has a separate media rendering tool that is compatible with the media item that is to be rendered.

By including a rendering engine model or specification in the media item, any suitable processor on a device can generate a rendering output using the raw media data and the rendering engine model in the media item. As such, the device does not need a separate and compatible media rendering tool for the specific media item. The media items and approaches herein can therefore eliminate or significantly reduce the need for standardization of media items, support new solutions for processing media data, and provide customized processing for different types of media data. The rendering engine models in the media items herein can be designed for the raw media data in the media items and can be customized for specific rendering intents and outcomes.

According to at least one example, methods for creating media items containing media data (e.g., raw or captured media data) and an embedded rendering engine model for rendering the media data are provided. A method can include obtaining media data captured by a data capturing device, embedding a rendering engine model in a media item containing the media data, and providing (e.g., sending, storing, outputting, etc.) the media item with the rendering engine model embedded in the media item to one or more devices. The one or more devices can obtain the media item and store the media item or use the rendering engine model in the media item to execute the neural network to process and render the media data in the media item. The neural network can use the media data as input to generate a rendered media data output.

The media data can include image data, video data, audio data, etc. The media item can include a file, a stream, or any other type of data container or object that can contain or encapsulate the media data and the rendering engine model. The rendering engine model can include a description of a neural network configured to process the media data and generate a particular media data output. The rendering engine model in the media item can indicate how to execute the neural network to process the media data and generate the particular media data output based on the description of the neural network. For example, the rendering engine model in the media item can inform the one or more devices and/or any other device with a copy of the media item how to execute the neural network to process the media data and generate the particular media data output.

The description of the neural network can define a neural network architecture for the neural network. The neural network architecture can include, for example, a neural network structure (e.g., number of layers, number of nodes in each layer, layer interconnections, etc.), neural network filters or operations, activation functions, parameters (e.g., weights, biases, etc.), etc. The description can also define how layers in the neural network are interconnected, how to form an input for the neural network, and how to form an output from the neural network. Moreover, the description can define one or more tasks of the neural network, such as one or more customized tasks for encoding the media data, decoding the media data, compressing or decompressing the media data, performing image processing operations (e.g., image restoration, image enhancement, demosaicing, filtering, scaling, color correction, color conversion, noise reduction, spatial filtering, image rendering, etc.), performing frame rate conversion (e.g., up-conversion, down-conversion), performing audio signal modification operations (e.g., producing a wide-band audio signal from a narrow-band audio input file), etc.

In another example, an apparatus is provided for creating media items containing media data (e.g., raw or captured media data) and an embedded rendering engine model for rendering the media data. The example apparatus can include memory and one or more processors configured to obtain media data captured by a data capturing device, embed a rendering engine model in a media item containing the media data, and provide (e.g., store, send, output, etc.) the media item with the rendering engine model embedded in the media item to one or more devices. The one or more devices can obtain the media item and store it or use the rendering engine model in the media item to execute the neural network to process and render the media data in the media item. The neural network can use the media data as input to generate a rendered media data output.

The media data can include image data, video data, audio data, etc. The media item can include a file, a stream, or any other type of data container or object that can contain or encapsulate the media data and the rendering engine model. The rendering engine model can include a description of a neural network configured to process the media data and generate a particular media data output. The rendering engine model in the media item can indicate how to execute the neural network to process the media data and generate the particular media data output based on the description of the neural network. For example, the rendering engine model in the media item can inform the one or more devices and/or any other device with a copy of the media item how to execute the neural network to process the media data and generate the particular media data output.

The description of the neural network can define a neural network architecture for the neural network. The neural network architecture can include, for example, a neural network structure (e.g., number of layers, number of nodes in each layer, layer interconnections, etc.), neural network filters or operations, activation functions, parameters (e.g., weights, biases, etc.), etc. The description can also define how layers in the neural network are interconnected, how to form an input for the neural network, and how to form an output from the neural network. Moreover, the description can define one or more tasks of the neural network, such as one or more customized tasks for encoding the media data, decoding the media data, compressing or decompressing the media data, performing image processing operations (e.g., image restoration, image enhancement, demosaicing, filtering, scaling, color correction, color conversion, noise reduction, spatial filtering, image rendering, etc.), performing frame rate conversion (e.g., up-conversion, down-conversion), performing audio signal modification operations (e.g., producing a wide-band audio signal from a narrow-band audio input file), etc.

In another example, non-transitory computer-readable media are provided for creating media items containing media data (e.g., raw or captured media data) and an embedded rendering engine model for rendering the media data are provided. A non-transitory computer-readable medium can store instructions that, when executed by one or more processors, cause the one or more processor to obtain media data captured by a data capturing device, embed a rendering engine model in a media item containing the media data, and provide (e.g., store, send, output, etc.) the media item with the rendering engine model embedded in the media item to one or more devices. The one or more devices can obtain the media item and store it or use the rendering engine model in the media item to execute the neural network to process and render the media data in the media item. The neural network can use the media data as input to generate a rendered media data output.

In another example, an apparatus is provided for creating media items containing media data (e.g., raw or captured media data) and an embedded rendering engine model for rendering the media data. The example apparatus can include means for obtaining media data captured by a data capturing device, means for embedding a rendering engine model in a media item containing the media data, and means for providing (e.g., storing, sending, outputting, etc.) the media item with the rendering engine model embedded in the media item to one or more devices. The one or more devices can obtain the media item and store it or use the rendering engine model in the media item to execute the neural network to process and render the media data in the media item. The neural network can use the media data as input to generate a rendered media data output.

The media data can include image data, video data, audio data, etc. The media item can include a file, a stream, or any other type of data container or object that can contain or encapsulate the media data and the rendering engine model. The rendering engine model can include a description of a neural network configured to process the media data and generate a particular media data output. The rendering engine model in the media item can indicate how to execute the neural network to process the media data and generate the particular media data output based on the description of the neural network. For example, the rendering engine model in the media item can inform the one or more devices and/or any other device with a copy of the media item how to execute the neural network to process the media data and generate the particular media data output.

The description of the neural network can define a neural network architecture for the neural network. The neural network architecture can include, for example, a neural network structure (e.g., number of layers, number of nodes in each layer, layer interconnections, etc.), neural network filters or operations, activation functions, parameters (e.g., weights, biases, etc.), etc. The description can also define how layers in the neural network are interconnected, how to form an input for the neural network, and how to form an output from the neural network. Moreover, the description can define one or more tasks of the neural network, such as one or more customized tasks for encoding the media data, decoding the media data, compressing or decompressing the media data, performing image processing operations (e.g., image restoration, image enhancement, demosaicing, filtering, scaling, color correction, color conversion, noise reduction, spatial filtering, image rendering, etc.), performing frame rate conversion (e.g., up-conversion, down-conversion), performing audio signal modification operations (e.g., producing a wide-band audio signal from a narrow-band audio input file), etc.

In some aspects, the methods, apparatuses, and computer-readable media described above can further include embedding multiple rendering engine models in the media item. For example, the methods, apparatuses, and computer-readable media can include embedding an additional rendering engine model in the media item. The additional rendering engine model can include an additional description of an additional neural network configured to process the media data and generate a different media data output. The additional description can define a different neural network architecture for the additional neural network. The different neural network architecture can be customized for a different operational outcome or rendering intent based on different neural network layers, filters or operations, activation functions, parameters, etc.

The media item with the rendering engine model and the additional rendering engine model can be provided to the one or more devices for storing the media item, processing the media item, and/or rendering the media data in the media item. In some examples, the media item can be provided to the one or more devices for storage. In other examples, the media item can be provided to the one or more devices for processing and/or rendering of the media data in the media item. For example, the one or more devices can receive the media item and select one of the multiple rendering engine models (e.g., the rendering engine model or the additional rendering engine model) and, based on the selected rendering engine model, run a respective neural network associated with the selected rendering engine model. The one or more devices can then process the media data in the media item using the respective neural network to obtain or generate a media data output from the respective neural network.

In some aspects, the methods, apparatuses, and computer-readable media described above can also include generating a test neural network configured to process and render raw media data, and training the test neural network based on media data samples. The test neural network can include a test neural network architecture, which can include a specific neural network structure (e.g., layers, nodes, interconnections, etc.), test filters or operations, test activation functions, test parameters (e.g., weights, biases, etc.), etc. The training of the test neural network can include processing the media data samples using the test neural network, determining a performance of the test neural network based on one or more outputs associated with the media data samples, determining one or more adjustments to the test neural network (and/or the test neural network architecture) based on the performance of the test neural network, and adjusting the test neural network (e.g., the test neural architecture, the test parameters, the test filters or operations, the test activation functions, the layers in the test neural network, etc.) based on the performance of the test neural network.

In some cases, determining the performance of the test neural network can include determining a degree of accuracy of the test neural network and/or a loss or error in the one or more outputs from the test neural network. For example, determining the performance of the test neural network can include applying a loss function, such as a mean squared error (MSE) function, to the one or more outputs to generate feedback, which can include a loss or error calculation or result. The feedback can be used to identify and make adjustments to tune the test neural network.

In some cases, the training and one or more adjustments can be used to determine the neural network architecture associated with the rendering engine model in the media item. For example, the test neural network architecture and the one or more adjustments to the test neural network architecture determined through the training can be used to determine a specific neural network architecture and configuration that can be used as the basis for the rendering engine model embedded in the media item.

In some examples, the methods, apparatuses, and computer-readable media described above can include embedding, in the media item, an address (e.g., uniform resource identifier (URI); a path; a network, storage or destination address; a link; a resource locator; etc.) to a remote rendering engine model or a remote location of the remote rendering engine model. The remote rendering engine model can include a respective description of a neural network configured to process the media data and generate a respective media data output. The media item with the address can be provided to the one or more devices, which can use the address to retrieve the remote rendering engine model from the remote location and, based on the respective description in the remote rendering engine model, generate the neural network associated with the remote rendering engine model and process the media data in the media item using the neural network to generate a respective media data output (e.g., a rendering of the media data).

This summary is not intended to identify key or essential features of the claimed subject matter, and is not exhaustive or intended to be used in isolation to determine the scope of the claimed subject matter. The subject matter should be understood by reference to appropriate portions of the entire specification of this disclosure, the drawings, and the claims.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIGS. 2A and 2B illustrate example flows for generating media items with embedded rendering engine models, in accordance with some examples;

FIGS. 3A and 3B illustrate example flows for processing media items with embedded rendering engine models and generating a rendering output, in accordance with some examples;

DETAILED DESCRIPTION

Figure 1:
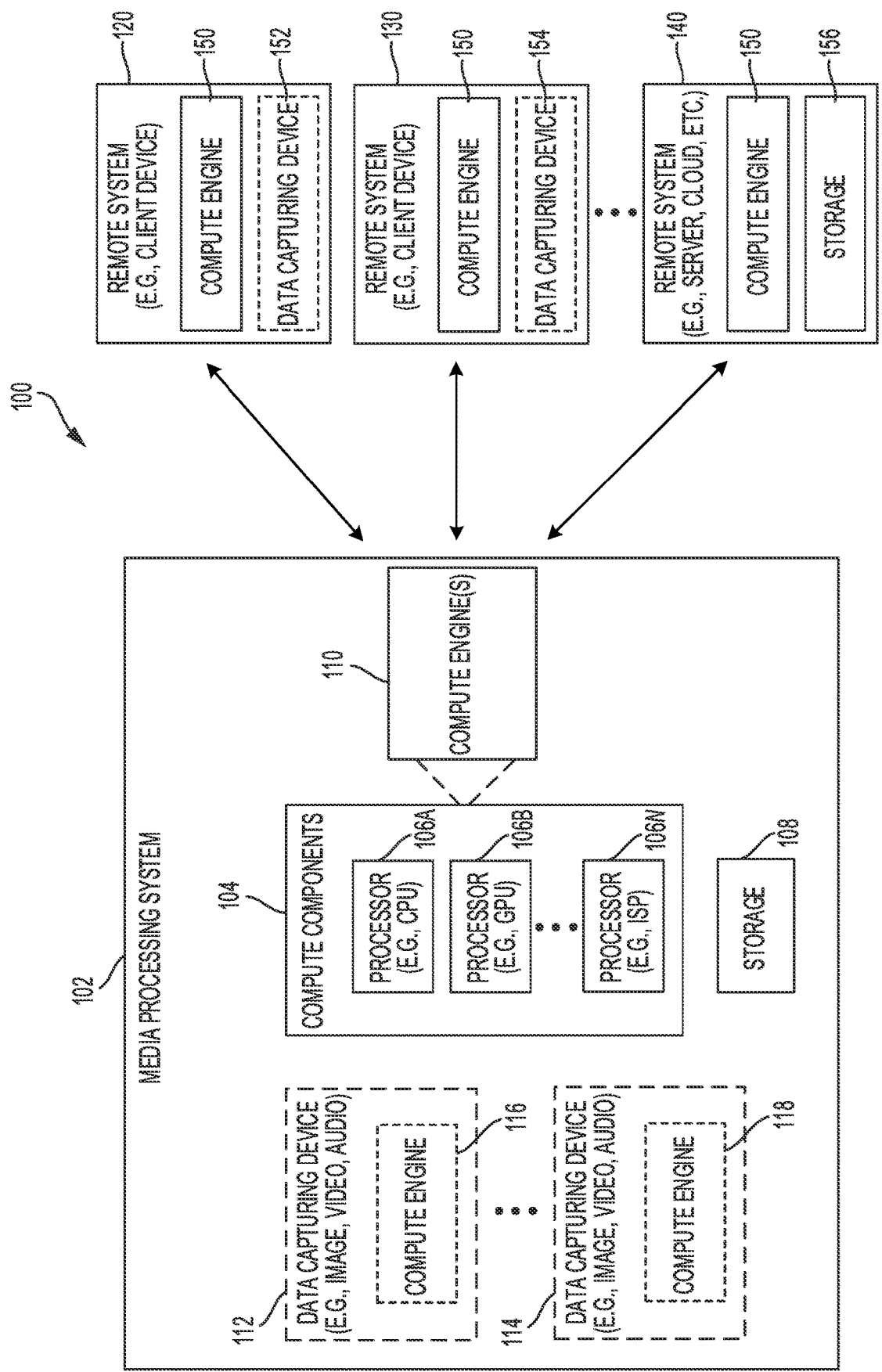
FIG. 1 is a block diagram illustrating an example environment including a media processing system, in accordance with some examples.

Certain aspects and embodiments of this disclosure are provided below. Some of these aspects and embodiments may be applied independently and some may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments and features only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, apparatuses, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that embodiments may be described as a process depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, features and embodiments may be implemented by hardware, software, firmware, middleware, microcode, hardware description languages, or any combination thereof. When implemented in software, firmware, middleware or microcode, the program code or code segments to perform specific tasks (e.g., a computer-program product) may be stored in a computer-readable or machine-readable medium. A processor(s) may perform the specific tasks.

The disclosed technology provides systems, methods and computer-readable storage media for generating media items containing raw media data and rendering engine models for rendering and processing the raw media data without a separate media rendering tool (e.g., a decoder, an encoder, an image processor, a neural network processor, and/or other media rendering tool). The raw media data can include media data captured by a data capturing device or sensor (e.g., image or video sensor, audio sensor, etc.) such as, for example, the crude, plain, uncompressed and/or unprocessed data (e.g., video data, image data, audio data, etc.) captured and/or outputted by the data capturing device or sensor.

In some aspects, the raw media data can include image data from a data capturing device or sensor (e.g., before or after being processed by one or more components of an image signal processor). The image data can be filtered by a color filter array. In some examples, the color filter array includes a Bayer color filter array. In some aspects, the raw media data can include a patch of raw image data. The patch of raw image data can include a subset of a frame of raw image data captured by the data capturing device or sensor. In some aspects, the raw media data can include raw audio data. The raw audio data can be included in raw audio files, which can contain, for example, uncompressed monaural pulse code modulation data.

In some cases, raw media data containing raw video and/or image data can include a plurality of pixels. For example, the raw media data can include a multi-dimensional array of numbers representing raw image pixels of an image associated with the raw media data. In one example, the array can include a 128×128×11 array of numbers with 128 rows and 128 columns of pixel locations and 11 input values per pixel location. In another illustrative example, the raw media data can include a raw image patch containing a 128×128 array of raw image pixels.

Moreover, raw media data containing raw image or video data can include one or more color components or color component values per pixel. For example, in some cases, the raw media data can include a color or grayscale value for each pixel location. A color filter array can be integrated with the data capturing device or sensor or can be used in conjunction with the data capturing device or sensor (e.g., laid over associated photodiodes) to convert the monochromatic information to color values. For example, a sensor with a color filter array, such as a Bayer pattern color filter array, with red, green, or blue filters at each pixel location can be used to capture raw image data with a color per pixel location.

In some examples, one or more apparatuses, methods, and computer-readable media are described for generating media items with embedded rendering engine models. The apparatuses, methods, and computer-readable media can be implemented to create media items, such as media files or streams, containing raw or captured media data (e.g., image data, video data, audio data, etc.) and a full specification of a rendering engine for the raw media data. The rendering engine model can be embedded in the media items along with the raw media data. The rendering engine models can be used to process and render the raw media data without a separate media rendering tool, regardless of the type or format of the media items or the requirements of the raw media data in the media items.

A computing device can use the rendering engine models in the media items to run a rendering engine defined for the media data, and render the media data without the need for a separate media rendering tool that is compatible with the media item to be rendered. By including a rendering engine model or specification in the media item, any suitable processor on a device can render the raw media data using the rendering engine model in the media item. The media items and approaches herein can therefore eliminate or significantly reduce the need for standardization of media items, support new solutions for media data, and provide customized processing for different types of media data. The rendering engine models herein can be customized to process the raw media data in the media items according to specific rendering intents and outcomes.

For example, a compressed audio file can include a rendering engine model that defines how to process or recover the audio stream in the audio file, and a video file can contain a rendering engine model that defines how to decompress the video stream from the video file. In other examples, an image file can contain a rendering engine model for rendering the raw image data to an RGB (red, green, and blue) viewable image with an 8× zoom, a narrow-band audio file can include a rendering engine model for producing a wide-band signal, and a video file can include a rendering engine model for 2× frame rate up-conversion.

In some implementations, a media item can include multiple rendering engine models. The different rendering engine models can be tailored for different rendering intents and processing outcomes. For example, a media item can include the raw media data, a first rendering engine model for a particular outcome, such as fast service with a quality trade-off, and a second rendering engine model for a different outcome, such as higher quality with a speed trade-off. The multiple rendering engine models can conveniently provide different rendering and processing capabilities, and afford users added control over the rendering and processing outcome.

In some cases, the rendering engine models can include a description of a neural network configured to process the media items and generate a particular media data output. The neural network can function as the rendering engine for the media items. The description of the neural network can define a neural network architecture and specific tuning and other parameters tailored for the particular rendering intent or outcome desired. For example, the description can define the building blocks for the neural network, such as the operations (e.g., 2d convolution, 1d convolution, pooling, normalization, fully-connected, etc.) and activation functions (e.g., Rectified Linear Unit, Exponential Linear Unit, etc.); the parameters for the neural network operations, such as weights or biases; how such building blocks interconnect; how to form the input to the neural network from the media data (e.g., a 128×128 patch of pixel data from the pixel data of an input image); and how to form the output from the neural network (e.g., output 64×64×3 patches and tile the output patches together to produce a final output).

The neural networks can be customized for various operations or rendering intents, such as data encoding and/or decoding, image/video processing, data compression and/or decompression, scaling, filtering, image restoration (e.g., noise reduction, etc.), image enhancement or alteration, and so forth. The neural networks can also be customized for specific rendering or processing outcomes, such as speed, quality, output accuracy, output size (e.g., image size, etc.), enhanced user experience, and so forth. The description of the neural networks can fully specify how to process a piece of data using the neural networks. For example, a raw image file can include a description of a neural network that models a camera ISP (Image Signal Processor) with the raw image data so the neural network can fully render a result as intended.

The neural network descriptions can be implemented with media items such as files or streams of data. For example, a camera sensor can stream raw data to a processor. The rendering engine model for the data can be sent by the camera sensor with the stream to the processor. The rendering engine model can include a description of a neural network architecture with parameters for rendering a viewable image from the raw sensor data. The processor can use the rendering engine model to execute the neural network and render the raw data accordingly. As another example, a compressed audio stream including a rendering engine model can be sent to a processor. The rendering engine model can be customized for decompressing the audio and/or any other processing outcome. The rendering engine model can include a description of a neural network architecture along with parameters for decompressing the audio, which the processor can use to execute the neural network and decompress the audio.

Figure 8:
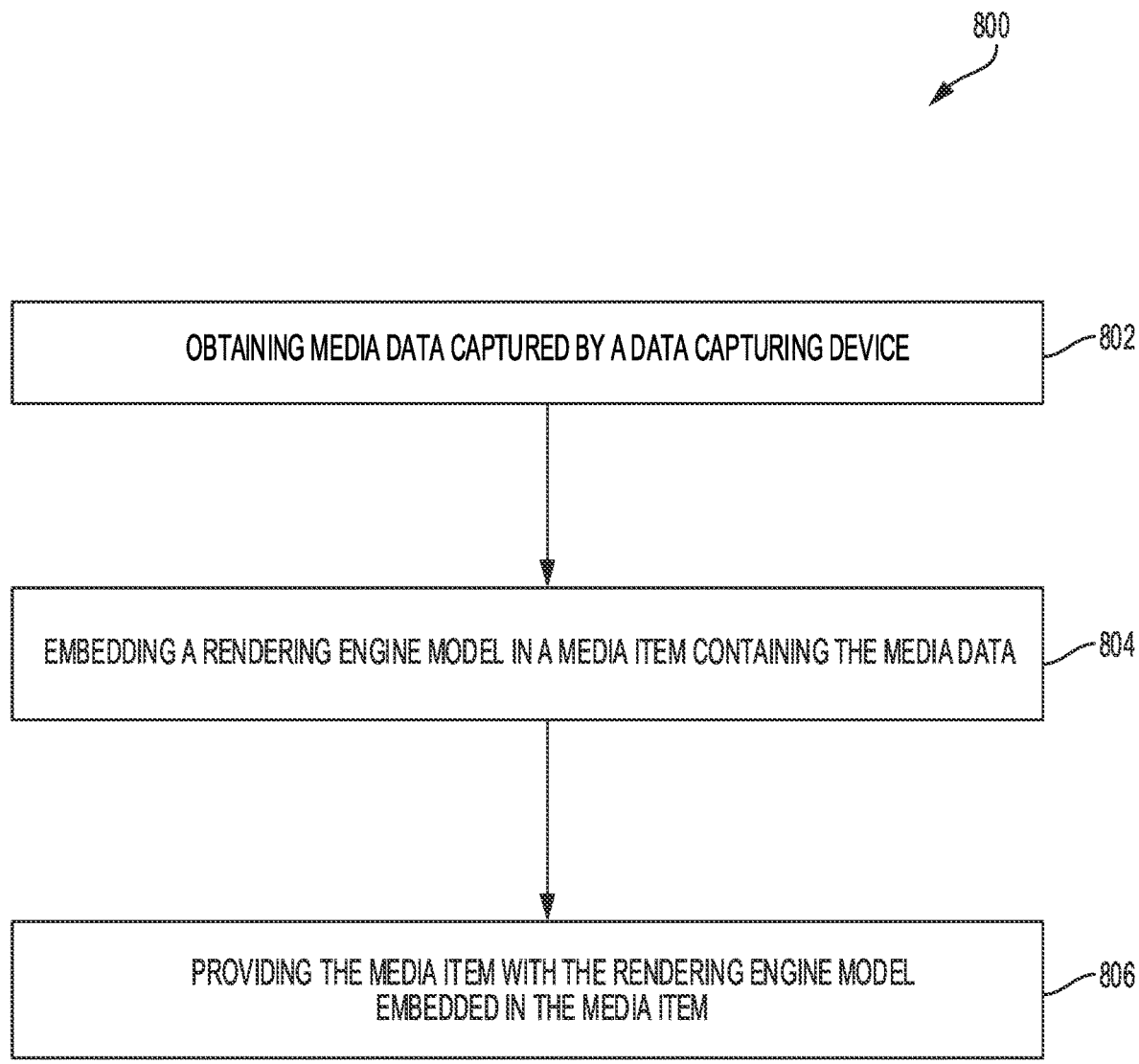
FIG. 8 illustrates an example method for providing a rendering engine model with a media item, in accordance with some examples.
Figure 9:
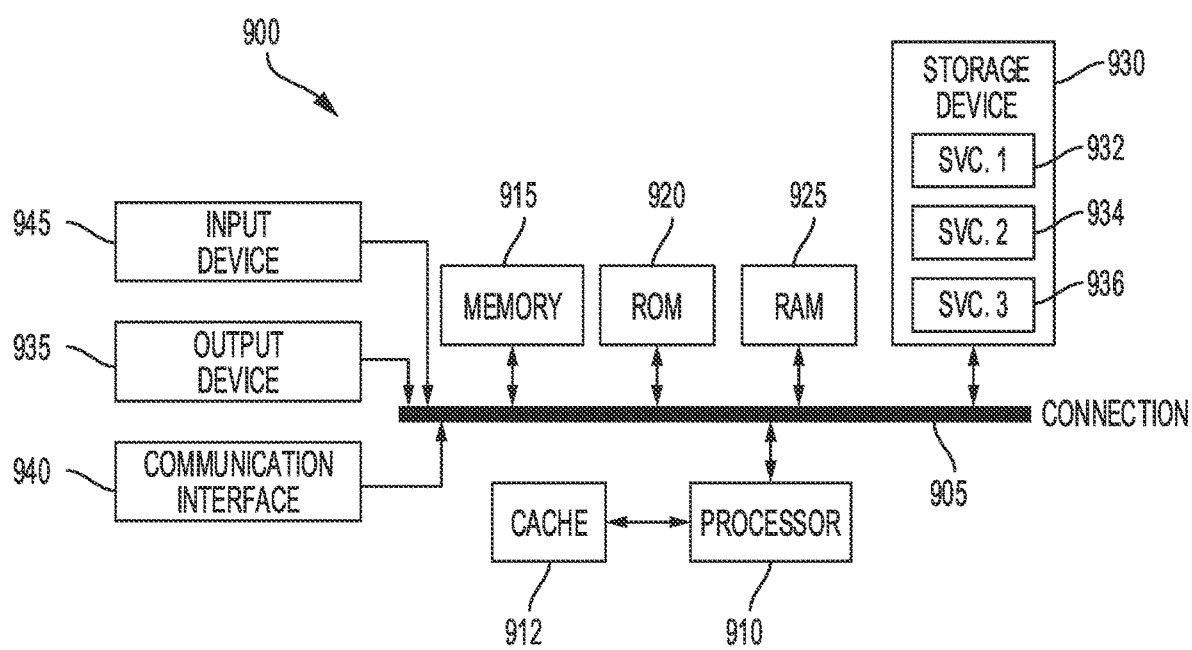
FIG. 9 illustrates an example computing device architecture, in accordance with some examples.

The disclosed technology will be described in more detail in the following disclosure. The discussion begins with a description of example systems, architectures, and methods for creating media items with embedded rendering engine models, customizing rendering engine models in media items for particular rendering intents and processing outcomes, and implementing neural networks with the rendering engine models, as shown in FIGS. 1 through 7. A description of an example method for creating media items with embedded rendering engine models, as illustrated in FIG. 8, will then follow. The discussion concludes with a description of an example computing device architecture, as illustrated in FIG. 9, including example hardware components suitable for creating media items with embedded rendering engine models, running rendering engines including neural networks, and performing other computing operations. The disclosure now turns to FIG. 1.

FIG. 1 is a diagram illustrating an example computing environment 100 including a media processing system 102 and remote systems 120, 130, 140. The media processing system 102 can obtain, store, and/or generate rendering engine models and/or create media items with embedded rendering engine models as described herein. As used herein, the term "media item" can include a file, a stream or bitstream, or any other data object or container capable of storing, containing, or encapsulating media data, rendering engine models, and any other data.

In this illustrative example, the media processing system 102 includes compute components 104, storage 108, compute engine 110, and data capturing devices 112, 114. The media processing system 102 can be part of a computing device or multiple computing devices. In some examples, the media processing system 102 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a gaming console, a streaming device, a drone, a computer in a car, an IoT (Internet-of-Things) device, a server, a distributed system, or any other suitable electronic device(s).

In some implementations, the compute components 104, storage 108, compute engine 110, and data capturing devices 112, 114 can be part of the same computing devices. For example, in some cases, the compute components 104, storage 108, compute engine 110, and data capturing devices 112, 114 can be integrated into a smartphone, laptop, tablet computer, smart wearable device, gaming system, and/or any other computing device. In other implementations, the compute components 104, storage 108, compute engine 110, and data capturing devices 112, 114 can be part of two or more separate computing devices. For example, the compute components 104, storage 108 and compute engine 110 can be part of one computing device, such as a smartphone or a laptop computer, and the data capturing devices 112, 114 can be part of (or represent) one or more separate computing devices, such as one or more separate cameras or computers.

The storage 108 can include any physical and/or logical storage device(s) for storing data. Moreover, the storage 108 can store data from any of the components of the media processing system 102. For example, the storage 108 can store data from the data capturing devices 112, 114 (e.g., image, video and/or audio data), data from the compute components 104 (e.g., processing parameters, calculations, processing outputs, data associated with compute engine 110, etc.), one or more rendering engine models, etc. The storage 108 can also store data received by the media processing system 102 from other devices, such as remote systems 120, 130, 140. For example, the storage 108 can store media data captured by data capture devices 152, 154 on remote systems 120, 130, rendering engine models or parameters from remote system 140, etc.

The data capturing devices 112, 114 can include any sensor or device for capturing or recording media data (e.g., audio, image and/or video data), such as a digital camera sensor, a video camera sensor, a smartphone camera sensor, an image/video capture device on an electronic apparatus such as a television or computer, a camera, a microphone, etc. In some examples, the data capturing device 112 can be an image/video capture device (e.g., a camera, video and/or image sensor, etc.) and the data capturing device 114 can be an audio capture device (e.g., a microphone).

Moreover, the data capturing devices 112, 114 can be standalone devices or part of a separate computing device or devices, such as a digital camera, a video camera, an IP camera, a smartphone, a smart television, a game system, an IoT device, a laptop computer, etc. In some examples, the data capturing devices 112, 114 can include compute engines 116, 118 for processing captured data, generating rendering engine models for the captured data, creating media items containing the captured data and the rendering engine models, and/or performing any other media processing operation. In some cases, the data capturing devices 112, 114 can capture media data and use the compute engines 116, 118 to locally create media items containing the captured media data and rendering engine models for processing and rendering the captured media data as described herein. In other cases, the data capturing devices 112, 114 can capture media data and send the captured media data to other devices or compute engines, such as compute components 104 and compute engine 110, for packaging the captured media data in a media item containing at least one rendering engine model for the captured media data.

The compute components 104 can include one or more processors 106A-N (collectively "106" hereinafter), such as a central processing unit (CPU), a graphics processing unit (GPU) 114, a digital signal processor (DSP), an image signal processor (ISP), etc. The processors 106 can perform various operations such as image enhancement, graphics rendering, augmented reality, image/video processing, sensor data processing, recognition (e.g., text recognition, object recognition, feature recognition, tracking or pattern recognition, scene recognition, etc.), image stabilization, machine learning, filtering, data processing, and any of the various operations described herein. In some cases, the compute components 104 can also include other electronic circuits or hardware, computer software, firmware, or any combination thereof, to perform any of the various operations described herein.

The compute components 104 can implement a compute engine 110. The compute engine 110 can be implemented by one or more of the processors 106 from the compute components 104. The compute engine 110 can process media data, render media data, create rendering engine models for processing and rendering raw or captured media data as described herein, create media items containing raw or captured media data and rendering engine models for the raw or captured media data, perform machine learning operations (e.g., create, configure, execute, and/or train neural networks or other machine learning systems), and/or perform any other media processing and computing operation.

The compute engine 110 can include one or more media processing engines, such as a rendering engine, a front-end processing engine, an image processing engine, a digital signal processing engine, etc. The one or more media processing engines can perform various media processing operations, such as filtering, demosaicing, scaling, color correction, color conversion, noise reduction, spatial filtering, scaling, frame rate conversion, audio signal processing, noise control or cancellation, image enhancement, data compression and/or decompression, data encoding and/or decoding, etc. In some examples, the compute engine 110 can include multiple processing engines which can be configured to perform the same or different computing operations.

In some cases, the compute engine 110 can receive media data (e.g., image data, video data, audio data, etc.) captured by any of the data capture devices 102, 104, 152, 154 in the computing environment 100, and receive, generate, and/or retrieve from storage one or more rendering engine models for the media data. The compute engine 110 can embed the one or more rendering engine models in a media item containing the media data, and/or embed an address (e.g., a uniform resource identifier (URI); a link; a path; a network, storage or destination address; a resource locator; etc.) to one or more rendering engine models in a media item containing the media data.

The remote systems 120, 130, 140 can represent client devices, such as smartphones or portable computers, cloud computing environments or services, servers, IoT devices, smart devices, or any other network, device or infrastructure. In the example illustrated in FIG. 1, the remote systems 120, 130 represent client devices and the remote system 140 represents a server or cloud compute environment. In this example, the remote systems 120, 130, can include data capture devices 152, 154 for capturing or recording media data such as video, image, and/or audio, and the remote system 140 can include a storage 156 which can serve as a repository of media data, rendering engine models, parameters, and/or other data. The storage 156 can include one or more physical and/or logical storage devices. For example, the storage 156 can represent a distributed storage system.

The remote systems 120, 130, 140 can also include compute engines 150. The compute engines 150 can include, for example and without limitation, image processing engines, digital signal processing engines, rendering engines, front-end processing engines, and/or any other processing or media engines. The compute engines 150 can perform various operations, such as filtering, demosaicing, scaling, color correction, color conversion, noise reduction, spatial filtering, scaling, frame rate conversion, audio signal processing, noise control or cancellation, image enhancement, data compression and/or decompression, data encoding and/or decoding, machine learning, etc. Moreover, the compute engines 150 can run or generate rendering engines as specified by rendering engine models associated with specific media items, use the rendering engines to process and render media data in the media items, generate rendering engine models, etc.

The media processing system 102 can communicate with remote systems 120, 130, 140 over one or more networks, such as a private network (e.g., local area network, a virtual private network, a virtual private cloud, etc.), a public network (e.g., the Internet), etc. The media processing system 102 can communicate with remote systems 120, 130, 140 to send or receive media data (e.g., raw or captured media data such as video, image, and/or audio data), send or receive rendering engine models, send or receive media items with embedded rendering engine models, store or retrieve rendering engine models for media items, etc.

While the media processing system 102, the data capturing devices 112, 114, and the remote systems 120, 130, 140 are shown to include certain components, one of ordinary skill will appreciate that the media processing system 102, the data capturing devices 112, 114, and/or the remote systems 120, 130, 140 can include more or fewer components than those shown in FIG. 1. For example, the media processing system 102, data capturing devices 112, 114, and remote systems 120, 130, 140 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the media processing system 102, the data capturing devices 112, 114, and the remote systems 120, 130, 140 are described below with respect to FIG. 9.

FIG. 2A illustrates an example flow 200 for generating a media item 220 with one or more embedded rendering engine models 230, 240. In this example, the compute engine 110 on the media processing system 102 can receive media data 210 and generate the media item 220 including the media data 210 and one or more rendering engine models 230, 240. The media data 210 can include raw media data captured by a media capturing device, such as audio, image, and/or video data captured by data capturing device 112, 114, 152, or 154.

The compute engine 110 can generate or obtain one or more rendering engine models 230, 240 configured to process and render the media data 210. Each rendering engine model 230, 240 can include a description or specification of a rendering engine configured to process the media data 210 and generate a particular media data output. The rendering engine can be customized for a particular processing outcome (e.g., speed, quality, performance, etc.) and/or rendering intent (e.g., size, format, playback or rendering quality and characteristics, output configuration, etc.). The particular media data output generated by the rendering engine can thus be according to such processing outcome and/or rendering intent.

In some examples, the rendering engine can be implemented by a neural network. Here, the rendering engine model (230 or 240) for the neural network can include a description or specification of the neural network, which can describe how to generate, configure, and execute the neural network. For example, the description or specification of the neural network can define an architecture for the neural network, such as the number of input nodes, the number and type of hidden layers, the number of nodes in each hidden layer, the number of output nodes, the filters or operations implemented by the neural network, the activation functions in the neural network, parameters for the neural network such as weights and biases, etc. The description or specification of the neural network can further define how layers in the neural network are connected to form a path of interconnected layers, how to form an input for the neural network based on the media data 210, and how to form an output from the neural network.

The description or specification of the neural network can also include any other information or instructions for configuring and/or executing the neural network to process the media data 210 for a particular processing outcome or rendering intent. For example, the description or specification of the neural network can define one or more customized tasks of the neural network, such as encoding the media data 210, decoding the media data 210, performing one or more compression or decompression operations on the media data 210, performing one or more image processing operations (e.g., image restoration, image enhancement, filtering, scaling, image rendering, demosaicing, color correction, re-sizing, etc.) on the media data 210, performing a frame rate conversion operation on the media data 210, performing an audio signal modification operation on the media data 210, etc.

After generating or obtaining the one or more rendering engine models 230, 240, the compute engine 110 can generate the media item 220 using the media data 210 and the one or more rendering engine models 230, 240. For example, the compute engine 110 can create a file, stream, or data container, and include or embed the media data 210 and the one or more rendering engine models 230, 240 in the file, stream or data container. The media item 220 can represent the resulting file, stream, or data container with the media data 210 and the one or more rendering engine models 230, 240.

In some examples, the media item 220 can include a single rendering engine model (e.g., 230 or 240) configured to process and render the media data 210. The single rendering engine model can be customized for a particular processing outcome and/or rendering intent, as previously explained. In other examples, the media item 220 can include multiple rendering engine models (e.g., 230 and 240) configured to process and render the media data 210 according to different processing outcomes and/or rendering intents. The multiple rendering engine models can provide added rendering and processing flexibility, control, and options. A device or user processing the media item 220 can select a particular rendering engine model to use for rendering the media data 210 in the media item 220. The particular rendering engine model can be selected based on the desired processing outcome and/or rendering intent.

Once the media item 220 is generated, it is ready for processing and can be used by the compute engine 110 to render the media data 210, or can be transmitted to a computing device, such as a remote system (e.g., 120, 130, 140) or an internal processing device (e.g., 106A, 106B, 106N), for processing and rendering.

FIG. 2B illustrates an example flow 250 for using a data capturing device 112 to capture the media data 210 and generate the media item 220 with the one or more embedded rendering engine models 230, 240. In this example, the data capturing device 112 can perform the flow 250 and produce both the media data 210 and the media item 220 with the one or more embedded rendering engine models 230, 240. This implementation allows the media item 220 to be generated by the same device (e.g., 112) that captured the media data 210, instead of having one device capture the media data 210 and a separate or external device produce the media item 220 from the media data 210.

For example, a camera or a device equipped with a camera (e.g., a smartphone, a laptop computer, a smart television, etc.) can capture the media data 210 and generate the media item 220 containing the media data 210 and the one or more rendering engine models 230, 240. At this point, the media item 220 is ready for rendering by any processing device. Thus, if a user wants to capture media data (e.g., images, video, etc.) from the camera or camera-equipped device and render the media data on another device, the camera or camera-equipped device can capture the media data 210 and prepare the media item 220 so it is ready for rendering from any other computing devices. The user will be able to render the media item 220 from another device, as received from the camera or camera-equipped device and without needing a separate decoder installed on the device. With this implementation, the manufacturer of the camera or camera-equipped device can ensure that the camera or camera-equipped device can capture media data and produce a final output that is ready for rendering by other devices without a separate decoder tool and without (or with limited) compatibility issues.

Returning to the example flow 250, the data capturing device 112 can first capture the media data 210. The data capturing device 112 can provide the media data 210 to the compute engine 116 as input, and the compute engine 116 can produce the media item 220 containing the media data 210 and the one or more rendering engine models 230, 240 for rendering the media data 210. The compute engine 116 can add or embed the media data 210 and the one or more rendering engine models 230, 240 to a file, stream, or data container or object to create the media item 220.

At this point, the media item 220 is ready for rendering by the data capturing device 112 or another computing device. For example, if a user wants to render the media data 210 from a separate device, the data capturing device 112 can provide the media item 220 to the separate device for rendering. As will be further explained below with respect to FIGS. 3A-B, the separate device can receive the media item 220, and use a rendering engine model in the media item 220 (e.g., rendering engine model 230 or 240) to run a rendering engine described or modeled by the rendering engine model. The rendering engine can be configured to process and render the media data 210 according to a specific processing outcome and/or rendering intent. The rendering engine on the separate device can then process and render the media data 210 in the media item 220 accordingly.

In example implementations where the media item 220 includes multiple rendering engine models, the user or the separate device can select a specific rendering engine model based on, for example, the respective processing outcomes and/or rendering intents associated with the various rendering engine models (e.g., 230 and 240). The separate device can render the media data 210 using a selected rendering engine model as previously described, and if a different processing outcome or rendering intent is desired, a different rendering engine model can be selected and implemented to produce a different rendering and/or processing result.

FIG. 3A illustrates an example flow 300 for processing media item 220 and generating a rendering output 310. In this example, the media item 220 is processed by the compute engine 110 on the media processing system 102. The media item 220 can be received by the compute engine 110 from another device or component, such as data capturing device 112, or generated by the compute engine 110 as previously explained. Thus, in some cases, the compute engine 110 can both generate and process the media item 220.

In flow 300, the compute engine 110 runs a rendering engine according to a rendering engine model in the media item 220 (e.g., 230 or 240). The rendering engine model can specify how to create the rendering engine. The compute engine 110 can analyze the selected rendering engine model to determine how to generate or execute the rendering engine. The rendering engine model can identify the structure, parameters, configuration, implementation information, etc., for the rendering engine, which the compute engine 110 can use to generate or execute the rendering engine.

Once the compute engine 110 executes the rendering engine, it can input the media data 210 into the rendering engine, which can then process the media data 210 to produce the rendering output 310. The rendering output 310 can be a rendering of the media data 210 according to the rendering intent or configuration of the rendering engine and/or the rendering intent or configuration reflected in the rendering engine model.

In some cases, the rendering engine can be a neural network configured to perform as a rendering engine for the media data 210. Here, the rendering engine model can include a description or specification of the neural network. The description or specification of the neural network can specify the building blocks and architecture of the neural network, and any other information that describes how to generate or execute the neural network, such as the neural network parameters (e.g., weights, biases, etc.), the operations or filters in the neural network, the number and type of layers in the neural network, the number of nodes in each layer, how the layers interconnect, how to form or process the input, how to form the output, etc. The compute engine 110 can use the description or specification to execute the neural network as defined by the description or specification. The neural network can process the media data 210 and generate the rendering output 310.

FIG. 3B illustrates another example flow 350 for processing the media item 220 and generating the rendering output 310. In this example, the media item 220 is processed and rendered by remote system 130. The media processing system 102 can generate and send the media item 220 to remote system 130. Remote system 130 can receive the media item 220 and process it using the compute engine 150 on the remote system 130.

The compute engine 150 can use a rendering engine model (e.g., 230 or 240) in the media item 220 to generate a rendering engine for the media data 210. The compute engine 150 can analyze the rendering engine model to identify the parameters, configuration information, instructions, etc., for the rendering engine, and generate or execute the rendering engine accordingly. For example, as previously explained, the rendering engine model can include a description or specification of a rendering engine, such as a neural network based rendering engine, which the compute engine 150 can use to execute the rendering engine.

Once the compute engine 150 executes the rendering engine, the rendering engine can process the media data 210 in the media item 220 and generate the rendering output 310 (e.g., the rendering of the media data 210). The rendering engine can process and render the media data 210 according to a processing outcome and/or rendering intent that the rendering engine was configured to achieve (e.g., as reflected in the rendering engine model). The remote system 130 can thus receive the media item 220 containing raw or captured media data (210), process the media item 220, and render the raw or captured media data in the media item 220 based on a rendering engine model in the media item 220 (e.g., 230 or 240), without use of a separate decoder or media rendering software.

Figure 4:
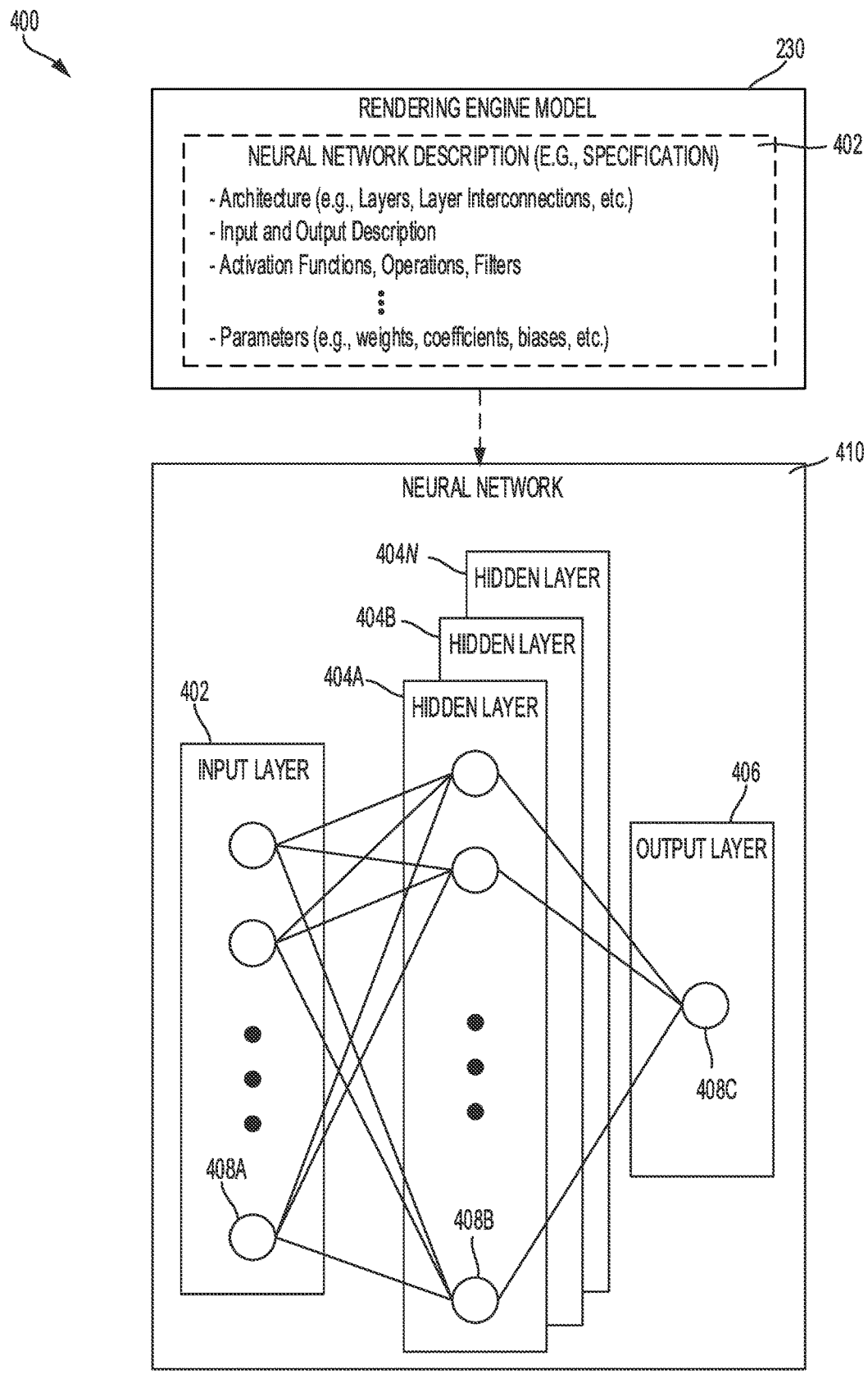
FIG. 4 illustrates an example rendering engine model and an example neural network architecture defined by the rendering engine model, in accordance with some examples.

FIG. 4 illustrates an example architecture 400 of a neural network 410 defined by an example neural network description 402 in rendering engine model 230. The neural network 410 can represent a neural network implementation of a rendering engine for rendering media data. The neural network description 402 can include a full specification of the neural network 410, including the neural network architecture 400. For example, the neural network description 402 can include a description or specification of the architecture 400 of the neural network 410 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 410 reflects the architecture 400 defined in the neural network description 402. In this example, the neural network 410 includes an input layer 402, which includes input data, such as media data (e.g., 210). In one illustrative example, the input layer 402 can include data representing a portion of the input media data (e.g., 210), such as a patch of data or pixels (e.g., a 128×128 patch of data) in an image corresponding to the input media data.

The neural network 410 includes hidden layers 404A through 404N (collectively "404" hereinafter). The hidden layers 404 can include n number of hidden layers, where n is an integer greater than or equal to one. The number of hidden layers can include as many layers as needed for a desired processing outcome and/or rendering intent. The neural network 410 further includes an output layer 406 that provides an output (e.g., rendering output 310) resulting from the processing performed by the hidden layers 404. In one illustrative example, the output layer 406 can provide a rendering of input media data (e.g., 210). In some cases, the output layer 406 can generate a patch of output (e.g., a 64×64×3 patch) for every patch of input data (e.g., the 128×128 patch of data in the previous example), and tile or aggregate each patch of output to generate a final output which provides a rendering of the input media data.

The neural network 410 in this example is a multi-layer neural network of interconnected nodes. Each node can represent a piece of information. Information associated with the nodes is shared among the different layers and each layer retains information as information is processed. In some cases, the neural network 410 can include a feed-forward neural network, in which case there are no feedback connections where outputs of the neural network are fed back into itself. In other cases, the neural network 410 can include a recurrent neural network, which can have loops that allow information to be carried across nodes while reading in input.

Information can be exchanged between nodes through node-to-node interconnections between the various layers. Nodes of the input layer 402 can activate a set of nodes in the first hidden layer 404A. For example, as shown, each of the input nodes of the input layer 402 is connected to each of the nodes of the first hidden layer 404A. The nodes of the hidden layer 404A can transform the information of each input node by applying activation functions to the information. The information derived from the transformation can then be passed to and can activate the nodes of the next hidden layer (e.g., 404B), which can perform their own designated functions. Example functions include convolutional, up-sampling, data transformation, pooling, and/or any other suitable functions. The output of the hidden layer (e.g., 404B) can then activate nodes of the next hidden layer (e.g., 404N), and so on. The output of the last hidden layer can activate one or more nodes of the output layer 406, at which point an output is provided. In some cases, while nodes (e.g., nodes 408A, 408B, 408C) in the neural network 410 are shown as having multiple output lines, a node has a single output and all lines shown as being output from a node represent the same output value.

In some cases, each node or interconnection between nodes can have a weight that is a set of parameters derived from training the neural network 410. For example, an interconnection between nodes can represent a piece of information learned about the interconnected nodes. The interconnection can have a numeric weight that can be tuned (e.g., based on a training dataset), allowing the neural network 410 to be adaptive to inputs and able to learn as more data is processed.

The neural network 410 can be pre-trained to process the features from the data in the input layer 402 using the different hidden layers 404 in order to provide the output through the output layer 406. In an example in which the neural network 410 is used to render images, the neural network 410 can be trained using training data that includes example images. For instance, training images can be input into the neural network 410, which can be processed by the neural network 410 to generate outputs which can be used to tune one or more aspects of the neural network 410, such as weights, biases, etc.

In some cases, the neural network 410 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For the example of rendering an image, the forward pass can include passing a training image through the neural network 410. The weights can be initially randomized before the neural network 410 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 410, the output can include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 410 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 410 can perform a backward pass by determining which inputs (weights) most contributed to the loss of the neural network 410, and can adjust the weights so that the loss decreases and is eventually minimized.

A derivative of the loss with respect to the weights can be computed to determine the weights that contributed most to the loss of the neural network 410. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 410 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 410 can represent any other neural or deep learning network, such as an autoencoder, a deep belief nets (DBNs), a recurrent neural networks (RNNs), etc.

Figure 5:
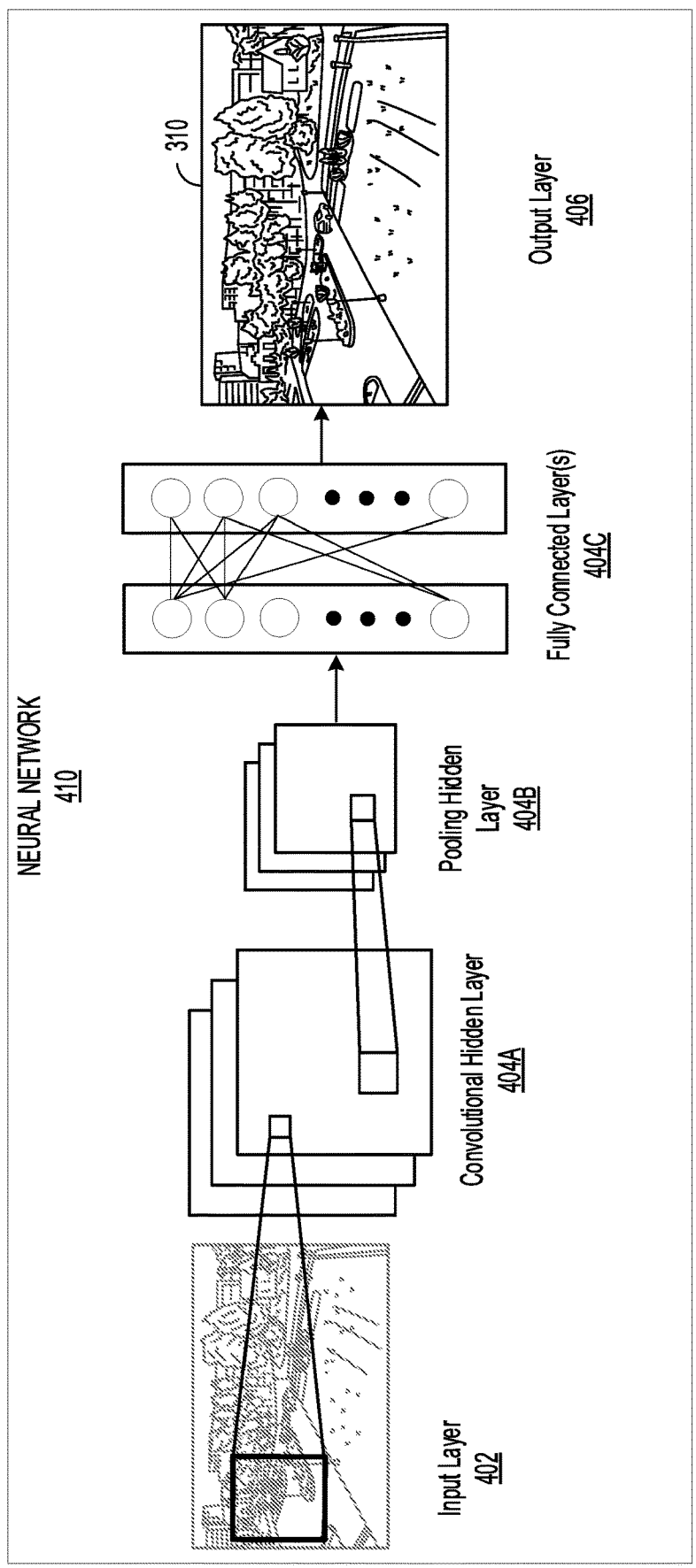
FIG. 5 illustrates an example use of a neural network defined by a rendering engine model for processing image data in a media item, in accordance with some examples.

FIG. 5 illustrates an example use of the neural network 410 defined by the rendering engine model 230 for processing image data (e.g., 210) in a media item (e.g., 220).

In this example, the neural network 410 includes an input layer 402, a convolutional hidden layer 404A, a pooling hidden layer 404B, fully connected layers 404C, and output layer 406. The neural network 410 can render the input image data to generate a rendered image (e.g., rendering output 310). First, each pixel or patch of pixels in the image data is considered as a neuron that has learnable weights and biases. Each neuron receives some inputs, performs a dot product and optionally follows it with a non-linearity function. The neural network 410 can also encode certain properties into the architecture by expressing a differentiable score function from the raw image data (e.g., pixels) on one end to class scores at the other and process features from the target image. After rendering portions of the image, the neural network 410 can generate a mean score (or z-score) of each rendered portion and take the average of the scores within the user-defined buffer.

In some examples, the input layer 404A includes raw or captured media data (e.g., 210). For example, the media data can include an array of numbers representing the pixels of an image, with each number in the array including a value from 0 to 255 describing the pixel intensity at that position in the array. The image can be passed through the convolutional hidden layer 404A, an optional non-linear activation layer, a pooling hidden layer 404B, and fully connected hidden layers 406 to get an output 310 at the output layer 406. The output 310 can be a rendering of the image.

The convolutional hidden layer 404A can analyze the data of the input layer 402A. Each node of the convolutional hidden layer 404A can be connected to a region of nodes (e.g., pixels) of the input data (e.g., image). The convolutional hidden layer 404A can be considered as one or more filters (each filter corresponding to a different activation or feature map), with each convolutional iteration of a filter being a node or neuron of the convolutional hidden layer 404A. Each connection between a node and a receptive field (region of nodes (e.g., pixels)) for that node learns a weight and, in some cases, an overall bias such that each node learns to analyze its particular local receptive field in the input image.

The convolutional nature of the convolutional hidden layer 404A is due to each node of the convolutional layer being applied to its corresponding receptive field. For example, a filter of the convolutional hidden layer 404A can begin in the top-left corner of the input image array and can convolve around the input data (e.g., image). As noted above, each convolutional iteration of the filter can be considered a node or neuron of the convolutional hidden layer 404A. At each convolutional iteration, the values of the filter are multiplied with a corresponding number of the original pixel values of the image. The multiplications from each convolutional iteration can be summed together to obtain a total sum for that iteration or node. The process is next continued at a next location in the input data (e.g., image) according to the receptive field of a next node in the convolutional hidden layer 404A. Processing the filter at each unique location of the input volume produces a number representing the filter results for that location, resulting in a total sum value being determined for each node of the convolutional hidden layer 404A.

The mapping from the input layer 402 to the convolutional hidden layer 404A can be referred to as an activation map (or feature map). The activation map includes a value for each node representing the filter results at each locations of the input volume. The activation map can include an array that includes the various total sum values resulting from each iteration of the filter on the input volume. The convolutional hidden layer 404A can include several activation maps representing multiple feature spaces in the data (e.g., the image).

In some examples, a non-linear hidden layer can be applied after the convolutional hidden layer 404A. The non-linear layer can be used to introduce non-linearity to a system that has been computing linear operations.

The pooling hidden layer 404B can be applied after the convolutional hidden layer 404A (and after the non-linear hidden layer when used). The pooling hidden layer 404B is used to simplify the information in the output from the convolutional hidden layer 404A. For example, the pooling hidden layer 404B can take each activation map output from the convolutional hidden layer 404A and generate a condensed activation map (or feature map) using a pooling function. Max-pooling is one example of a function performed by a pooling hidden layer. Other forms of pooling functions can be used by the pooling hidden layer 404B, such as average pooling or other suitable pooling functions.

A pooling function (e.g., a max-pooling filter) is applied to each activation map included in the convolutional hidden layer 404A. In the example shown in FIG. 5, three pooling filters are used for three activation maps in the convolutional hidden layer 404A. The pooling function (e.g., max-pooling) can reduce, aggregate, or concatenate outputs or feature representations in the input (e.g., image). Max-pooling (as well as other pooling methods) offer the benefit that there are fewer pooled features, thus reducing the number of parameters needed in later layers.

The fully connected layer 404C can connect every node from the pooling hidden layer 404B to every output node in the output layer 406. The fully connected layer 404C can obtain the output of the previous pooling layer 404B (which can represent the activation maps of high-level features) and determine the features or feature representations that provide the best representation of the data. For example, the fully connected layer 404C layer can determine the high-level features that provide the best or closest representation of the data, and can include weights (nodes) for the high-level features. A product can be computed between the weights of the fully connected layer 404C and the pooling hidden layer 404B to obtain probabilities for different features.

The output from the output layer 406 can include a rendering (e.g., 310) of the input media data. In some examples, the output from the output layer 406 can include patches of output that are then tiled or combined to produce a final rendering or output (e.g., 310). Other example outputs can also be provided.

Figure 6:
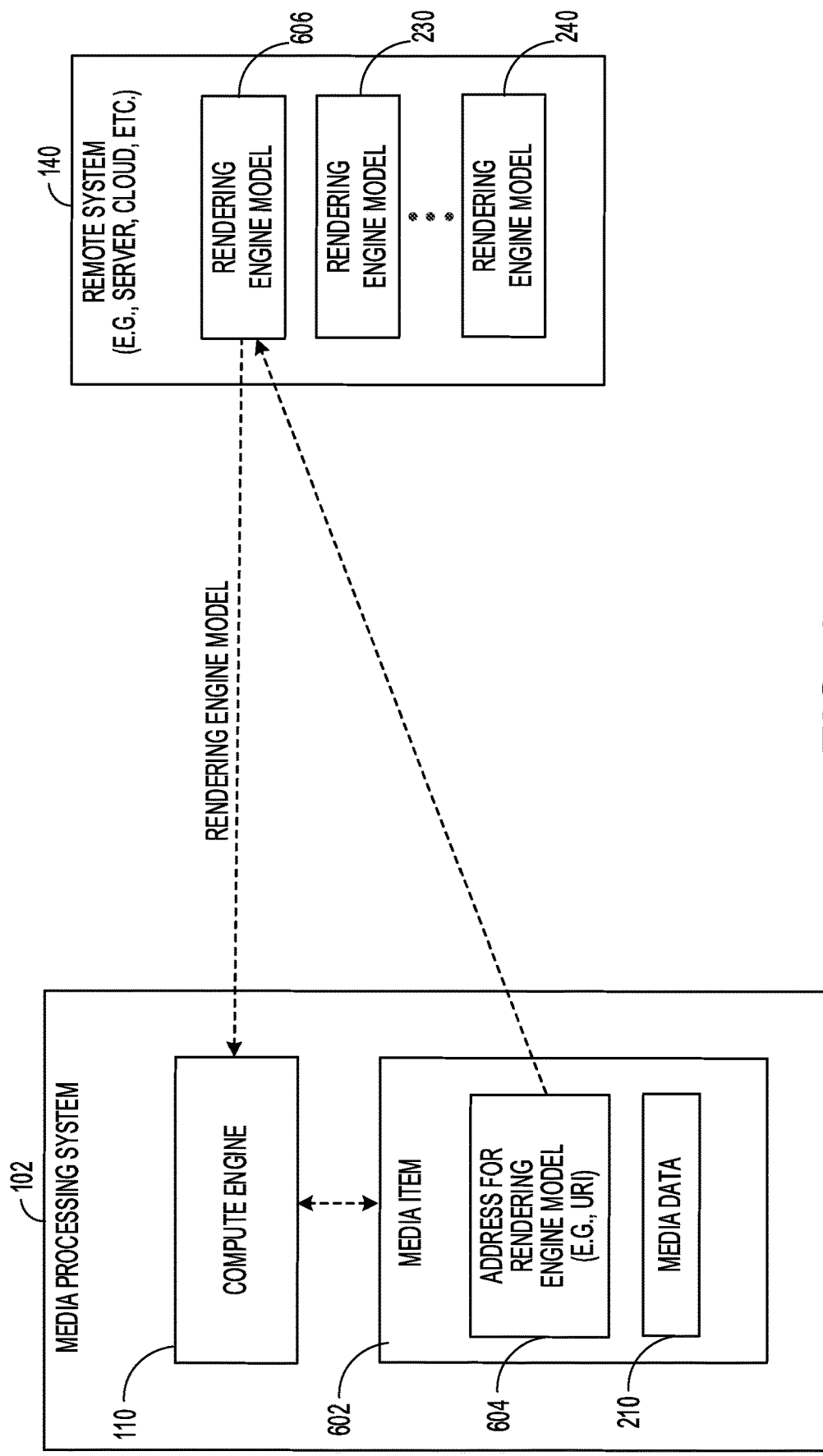
FIG. 6 illustrates an example implementation of a media item with an embedded address to a remote rendering engine model for media data in the media item, in accordance with some examples.

FIG. 6 illustrates an example implementation of a media item 602 that contains the media data 210 and an embedded address 604 to a rendering engine model 606 that is stored remotely. The rendering engine model 606 can be a particular rendering engine model capable of rendering the media data 210. In this example, the rendering engine model 606 is stored in the remote system 140. The remote system 140 can store one or more rendering engine models 606, 230, 240 for the media data 210 (and other media data), which can be access by the media processing system 102 (and any other device) to process and render media data.

In some cases, the remote system 140 can store multiple rendering engine models configured for different processing outcomes, rendering intents, and/or media data. For example, the remote system 140 can store multiple rendering engine models for the media data 210, with each rendering engine model being customized for a different processing outcome and/or rendering intent. The remote system 140 can compute and/or store numerous rendering engine models to provide a wide array of customization options. Moreover, the remote system 140 can be implemented to offload processing and resource use for storing and/or computing rendering engine models, provide a greater amount of rendering engine model options to clients, reduce the size of the media items (e.g., 602), and/or otherwise reduce the burden (processing and/or resource use) on clients and provide a wider array of rendering engine models with increased customization or granularity.

In some cases, the remote system 140 can have the infrastructure and capabilities, such as storage and/or compute capabilities, to compute and/or maintain a large number of rendering engine models. For example, the remote system 140 can be a server or cloud service containing a large repository of rendering engine models and having the compute capabilities to generate and store rendering engine models having increased complexity, customization, size, etc. The remote system 140 can also train rendering engine models and make the trained rendering engine models available as described herein. The remote system 140 can utilize its resources to train and tune rendering engine models and provide highly tuned rendering engine models.

In the illustrative example in FIG. 6, the media item 602 includes the media data 210 and the address 604 to rendering engine model 606 on the remote system 140. The address 604 can include, for example, a uniform resource identifier (URI), a link, a path, a resource locator, or any other address such as a network, storage or destination address. The address 604 indicates where the rendering engine model 606 is located and/or how it can be retrieved. When the media processing system 102 processes the media item 602 (e.g., as described in flow 300 illustrated in FIG. 3A), it can use the address 604 to retrieve the rendering engine model 606 from the remote system 140. Once the media processing system 102 has retrieved the rendering engine model 606 from the remote system 140, it can use it to execute the rendering engine described by the rendering engine model 606. The media processing system 102 can then use the rendering engine to process and render the media data 210.

In some cases, the media item 602 can include multiple addresses to multiple rendering engine models. For example, the media item 602 can include addresses to rendering engine models 606, 230, and 240 on the remote system 140. This can afford the media processing system 102 a wider array of processing and rendering options. The media processing system 102 (or an associated user) can select or identify a particular rendering engine model corresponding to one of the addresses to use in processing the media data 210. The media processing system 102 (or the associated user) can select the particular rendering engine model based on, for example, a particular processing outcome and/or rendering intent associated with that rendering engine model.

To illustrate, the media processing system 102 (or the associated user) can compare the rendering engine models associated with the addresses and/or their respective processing outcomes and/or rendering intents. The media processing system 102 (or the associated user) can then select a particular rendering engine model that best matches or serves a desired processing outcome and/or rendering intent. The media processing system 102 can retrieve the selected rendering engine model using a corresponding address in the media item 602, and use the selected rendering engine model to execute an associated rendering engine and process the media data 210 as previously described.

In some cases, to help the media processing system 102 (or associated user) select a rendering engine model when the media item 602 has multiple addresses and thus provides multiple options, each of the addresses on the media item 602 can include information about the respective rendering engine model associated with that address. For example, each address can include a description, unique identifier, and/or other information about the rendering engine model it points to. The description in the address can include, for example and without limitation, a processing outcome associated with the rendering engine model, a rendering intent associated with the rendering engine model, one or more parameters of the rendering engine model, statistics associated with the rendering engine model, a summary of the rendering engine model and/or its specification, a rating associated with the rendering engine model, a suggestion or recommendation for when or how to select or implement the rendering engine model, a listing of advantages and disadvantages associated with the rendering engine model, etc.

In some cases, a address (e.g., 604) can include such information (e.g., description information) even if it is the only address in the media item 602. The media processing system 102 (or associated user) can use this information to determine whether the rendering engine model associated with the address is suitable for the particular instance or comports with the desired processing or rendering outcome. If the media processing system 102 (or associated user)

determines that the rendering engine model associated with the address is not suitable or desirable, or the media processing system 102 (or associated user) wants a different rendering engine model or additional options, the media processing system 102 can either generate a different rendering engine model as previously described, or request a different rendering engine model from the remote system 140. The remote system 140 can identify or compute a different rendering engine model for the media processing system 102 based on the request. For example, the remote system 140 can compute a different rendering engine model based on information provided in the request from the media processing system 102. The information in the request can include, for example, an indication of a desired processing outcome and/or rendering intent, an indication of one or more desired parameters or configuration details for the rendering engine model, etc.

In some cases, the media processing system 102 (or associated user) can select a rendering engine model in a different manner with or without use of descriptive information in the addresses. For example, to select between rendering engine models associated with multiple addresses in the media item 602, the media item 602 can communicate with the remote system 140 to request or retrieve information about the rendering engine models, such as a description of the respective processing outcomes and/or rendering intents of the rendering engine models, a description of the respective specifications of the rendering engine models, statistics associated with the rendering engine models, associated rankings, etc. In another example, the media processing system 102 can send a query to the remote system 140 containing parameters or attributes (e.g., processing outcome, rendering intent, configuration parameters, etc.) describing a desired rendering engine model. The remote system 140 can receive the query and use the parameters or attributes to identify, suggest, or compute a rendering engine model.

Figure 7:
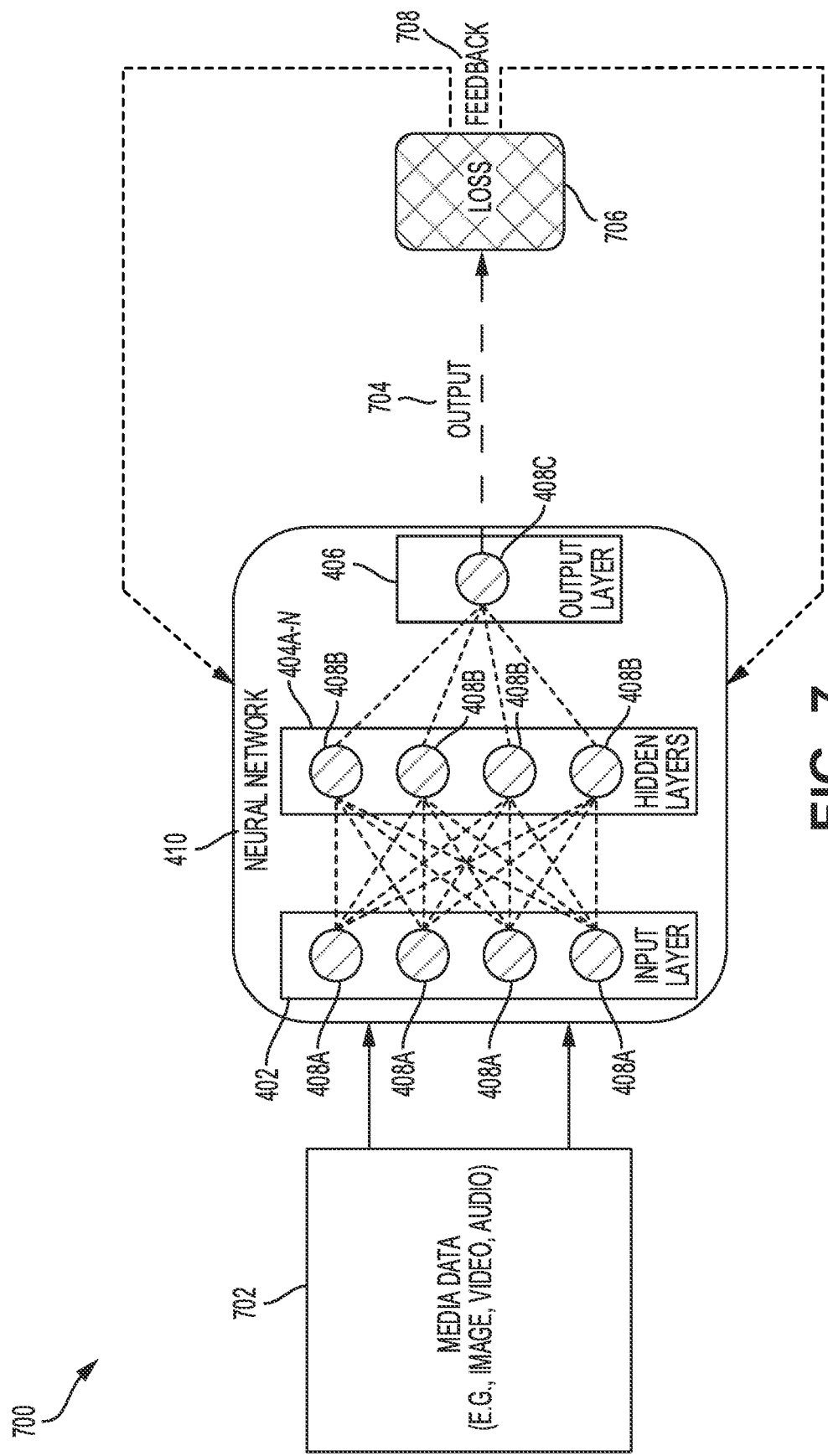
FIG. 7 illustrates an example process for training a neural network to identify an optimized configuration of the neural network for a rendering engine model describing the neural network, in accordance with some examples.

FIG. 7 illustrates an example flow 700 for training the neural network 410 to identify an optimized configuration of the neural network 410. The optimized configuration derived from the training can be used to create a rendering engine model describing the neural network 410 with the optimized configuration. The training of the neural network 410 can be performed for various rendering engine model implementation scenarios. For example, the training of the neural network 410 can be used to train and tune rendering engines and associated rendering engine models provided by the remote system 140 to clients as shown in FIG. 6.

As another example, the training of the neural network 410 can be used in cases where a data capture device (e.g., 112, 114, 152, 154) is adapted to not only capture media data (e.g., 210) but also provide the media data with one or more rendering engine models for the media data, as shown in FIG. 2B. To illustrate, knowing the capabilities of the data capturing device 112 and the characteristics of media data captured by the data capturing device 112, the manufacturer of the data capturing device 112 can design rendering engine models suitable for rendering the media data captured by the data capturing device 112, which the data capturing device 112 can provide with the media data it captures. The rendering engine models can be pre-configured by the manufacturer, and can describe rendering engines (e.g., neural networks) which have been trained and tuned as described in flow 700. The rendering engines associated with the rendering engine models can be tailored to the capabilities of the data capturing device 112 and/or the characteristics of the media data it produces.

Returning to flow 700, media data samples 702 can be used as the training input for the neural network 410. The media data samples 702 can include n samples of image, video, and/or audio data, where n is an integer that is greater or equal to one. In some examples, the media data samples 702 can include raw images or frames (e.g., image and/or video frames) captured by one or more data capture devices.

The media data samples 702 can be used to train the neural network 410 to achieve a particular processing outcome and/or rendering intent. The goal can be to find the optimal tuning and configuration parameters (e.g., weights, biases, etc.) to achieve the particular processing outcome and/or rendering intent.

The media data samples 702 are first processed through the neural network 410 (e.g., via the input layer 402, hidden layers 404, and output layer 406) based on existing weights of the nodes 408A-C or the interconnection between the nodes 408A-C in the neural network 410. The neural network 410 then outputs, via the output layer 406, a rendering output 704 generated for the media data samples 702. The rendering output 704 from the neural network 410 is provided to a loss function 706, such as a mean squared error (MSE) function or any other loss function, which generates feedback 708 for the neural network 410. The feedback 708 provides the cost or error (e.g., mean squared error) in the rendering output 704. In some cases, the cost or error is relative to a target or ideal output, such as a target rendering output for the media data samples 702.

The neural network 410 can adjust/tune the weights of the nodes 408A-C or the interconnection between the nodes 408A-C in the neural network 410 based on the feedback 708. By adjusting/tuning the weights based on the feedback 708, the neural network 410 can reduce the error in the rendering output (e.g., 704) of the neural network 410 and optimize the performance and output of the neural network 410. The process can repeat for a certain number of iterations for each set of training data (e.g., the media data samples 702) until the weights in the neural network 410 are tuned to a desired level.

Having disclosed example systems and concepts, the disclosure now turns to the example method 800 for providing a rendering engine model with a media item, as shown in FIG. 8. For the sake of clarity, the method 800 is described with reference to the media processing system 102 and various components shown in FIG. 1 and the neural network 410 shown in FIGS. 4, 5, and 7, configured to perform the various steps in the method 800. The steps outlined herein are examples and can be implemented in any combination thereof, including combinations that exclude, add, or modify certain steps.

At step 802, the media processing system 102 obtains media data (e.g., 210) captured by a data capturing device (e.g., 112). The media data can include, for example, raw image data, raw video data, raw audio data, metadata, etc.

At step 804, the media processing system 102 embeds a rendering engine model (e.g., 230) in a media item (e.g., 220) containing the media data (e.g., 210). The rendering engine model can include a description (e.g., 402) of a neural network (e.g., 410) configured to process the media data in the media item, and generate a particular media data output (e.g., rendering output 310). The rendering engine model can be optimized or customized for the condition under which the media data is captured, characteristics of the media data, the amount of computing complexity for deciphering the media data, providing specific processing and/or rendering options or features to the user, etc.

The description can define a neural network architecture (e.g., 400) for the neural network, such as a structure (e.g., number of layers, number of nodes in each layer, an interconnection of the layers, etc.) of the neural network, a set of filters or operations implemented by the neural network, activation functions implemented by the neural network, parameters (e.g., weights, biases, etc.) implemented along a path of interconnected layers in the neural network, etc. In some cases, the description of the neural network can define how layers in the neural network are interconnected, how to form an input for the neural network based on the media data (e.g., input or data patch size and characteristics, etc.) and how to form an output from the neural network (e.g, output size and characteristics, etc.).

For example, the description can indicate that the input is a 128×128 patch of data from the media data, and the neural network outputs 64×64×3 patches of data from the media data and combines or tiles the 64×64×3 output patches of data to obtain a final output. Moreover, in some cases, the description of the neural network can define one or more tasks of the neural network, such as one or more customized tasks for encoding the media data, decoding the media data, compressing or decompressing the media data, performing image processing operations (e.g., image restoration, image enhancement, demosaicing, filtering, scaling, color correction, color conversion, noise reduction, spatial filtering, image rendering, etc.), performing frame rate conversion (e.g., up-conversion, down-conversion), performing audio signal modification operations (e.g., producing a wide-band audio signal from a narrow-band audio input file), etc.

At step 806, the media processing system 102 can provide (e.g., send, store, output, etc.) the media item (e.g., 220) containing the media data (e.g., 210) and the rendering engine model (e.g., 230) to a recipient (e.g., compute engine 110, remote system 120, remote system 130, a storage device, or other recipient) for rendering and/or storage. In some cases, the recipient can be a device or component within the media processing system 102. In other cases, the recipient can be a separate or external device, such as a server, a storage system, a client device that requested the media item, a client device that the media processing system 102 identified (e.g., via an instruction or signal) as an intended recipient of the media item, etc.

The rendering engine model in the media item can include instructions for executing the neural network to process the media data (e.g., 210) in the media item (e.g., 220) and generate the particular media data output (e.g., rendering output 310) based on the description of the neural network. The instructions can indicate to the recipient how to execute the neural network and to generate the particular media output based on the description of the neural network. The recipient can receive the media item and use the rendering engine model in the media item to execute the neural network to process and render the media data in the media item. The neural network can use the media data as input to generate a rendered media data output.

In some cases, the media processing system 102 can include multiple rendering engine models (e.g., 230, 240) and/or addresses (e.g., 604) in the media item. For example, the media processing system 102 can embed an additional rendering engine model (e.g., 240) in the media item (e.g., 220). The additional rendering engine model can include an additional description of an additional neural network configured to process the media data (e.g., 210) and generate a different media data output. The additional description can define a different neural network architecture for the additional neural network. The different neural network architecture can be customized for a different operational outcome based on different neural network layers, filters, activation functions, parameters, etc. The media processing system 102 can send the media item with the rendering engine model and the additional rendering engine model to the recipient for processing and rendering of the media data.

The recipient can receive the media item and select one of the multiple rendering engine models (e.g., the rendering engine model or the additional rendering engine model) and, based on the selected rendering engine model, generate a respective neural network associated with the selected rendering engine model. The recipient can then process the media data in the media item using the respective neural network to obtain or generate a media data output from the respective neural network.

In some cases, the method 800 can include generating a test neural network configured to process and render raw media data and training the test neural network based on media data samples (e.g., 702). The test neural network can include a test neural network architecture, which can include a specific neural network structure (e.g., layers, nodes, interconnections, etc.), test filters or operations, test activation functions, test parameters (e.g., weights, biases, etc.), etc. The training of the test neural network can include processing the media data samples using the test neural network, determining a performance of the test neural network based on one or more outputs (e.g., 704) associated with the media data samples, determining one or more adjustments (e.g., 708) to the test neural network (and/or the test neural network architecture) based on the performance of the test neural network, and adjusting the test neural network (e.g., the test neural architecture, the test parameters, the test filters or operations, the test activation functions, the layers in the test neural network, etc.) based on the performance of the test neural network.

In some cases, determining the performance of the test neural network can include determining a degree of accuracy of the test neural network and/or a loss or error in the one or more outputs from the test neural network. For example, determining the performance of the test neural network can include applying a loss function (e.g., 706) to the one or more outputs to generate feedback (e.g., 708), which can include a loss or error calculation. The feedback can be used to identify and make adjustments to tune the test neural network.

In some cases, the training and one or more adjustments can be used to determine the neural network architecture associated with the rendering engine model (e.g., 230) in the media item (e.g., 220). For example, the test neural network architecture and the one or more adjustments to the test neural network architecture determined through the training can be used to determine a specific neural network architecture and configuration that can be used as the basis for the rendering engine model that is included in the media item.

In some implementations, the method 800 can include embedding, in the media item, a address (e.g., 604) to a remote rendering engine model or a remote location of the remote rendering engine model. The remote rendering engine model can include a respective description of a neural network configured to process the media data and generate a respective media data output. The media item with the address can be sent to a recipient, which can use the address to retrieve the remote rendering engine model from the remote location and, based on the respective description in the remote rendering engine model, generate the neural network associated with the remote rendering engine model and process the media data in the media item using the neural network to generate the respective media data output (e.g., the rendering of the media data).

In some examples, the method 800 can be performed by a computing device or an apparatus, such as the computing device shown in FIG. 9 or the media processing system 102 shown in FIG. 1. In some cases, the computing device or apparatus may include a processor, microprocessor, microcomputer, or other component of a device that is configured to carry out the steps of method 800. In some examples, the computing device or apparatus may include an data capture device (e.g., 112, 114, 152, 154) configured to capture media data, such as audio, images and/or video data (e.g., video frames). For example, the computing device may include a mobile device with a data capture device or system (e.g., a digital camera, an IP camera, a mobile phone or tablet including an image capture device, or other type of system with a data capture device). In some examples, a data capture device can be separate from the computing device, in which case the computing device receives the captured media data.

In some cases, the computing device may include a display for displaying the output media data, such as rendered images, video, and/or audio. In some cases, the computing device may include a video codec. The computing device may further include a network interface configured to communicate data, such as image, audio, and/or video data. The network interface may be configured to communicate Internet Protocol (IP) based data or other suitable network data.

Method 800 is illustrated as a logical flow diagram, the steps of which represent a sequence of steps or operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like, that perform particular functions or implement particular data types. The order in which the operations are described is not intended to be construed as a limitation or requirement, and any number of the described operations can be combined in any order and/or in parallel to implement the processes.

Additionally, the method 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, a neural network can be used to render media data. Any suitable neural network can be used to render the media data. Illustrative examples of neural networks that can be used include a convolutional neural network (CNN), an autoencoder, a deep belief net (DBN), a recurrent neural networks (RNN), or any other suitable neural network.

In some examples, decoded or rendered data may be output from an output interface to a storage device. Similarly, decoded or rendered data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing media data. In a further example, the storage device may correspond to a file server or another intermediate storage device that may store decoded or rendered data. A device may access stored data from the storage device via streaming or download. The file server may be any type of server capable of storing data and transmitting that data to a destination device. Example file servers include a web server (e.g., for a website), an FTP server, network attached storage (NAS) devices, or a local disk drive. A device may access the data through any standard data connection, including an Internet connection. This may include a wireless channel (e.g., a Wi-Fi connection), a wired connection (e.g., DSL, cable modem, etc.), or a combination of both that is suitable for accessing data stored on a server. The transmission of data from the storage device may be a streaming transmission, a download transmission, or a combination thereof.

The techniques of this disclosure may be applied in any of a variety of multimedia applications, such as over-the-air television broadcasts, cable television transmissions, satellite television transmissions, Internet streaming video transmissions, such as dynamic adaptive streaming over HTTP (DASH), digital video on a data storage medium, decoding of digital media stored on a data storage medium, or other applications. In some examples, a system may be configured to support one-way or two-way video transmission to support applications such as video streaming, video playback, video broadcasting, and/or video telephony.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the features disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

FIG. 9 illustrates an example computing system architecture 900 of a computing device which can implement the various techniques described herein. For example, the computing system architecture 900 can be implemented by the media processing system 102 shown in FIG. 1 to perform the media data processing and rendering techniques described herein. The components of the computing system architecture 900 are shown in electrical communication with each other using a connection 905, such as a bus. The example computing device 900 includes a processing unit (CPU or processor) 910 and a computing device connection 905 that couples various computing device components including the computing device memory 915, such as read only memory (ROM) 920 and random access memory (RAM) 925, to the processor 910. The computing device 900 can include a cache of high-speed memory connected directly with, in close proximity to, or integrated as part of the processor 910. The computing device 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method of providing a rendering engine model for raw media data, the method comprising:
    obtaining media data captured by a data capturing device, the media data comprising at least one of image data, video data, and audio data;
    embedding the rendering engine model in a media item containing the media data, the rendering engine model comprising a description of a neural network configured to process the media data and generate a particular rendering data output that can be displayed, the description defining a neural network architecture for the neural network; and
    providing, to one or more devices, the media item with the rendering engine model embedded in the media item, the rendering engine model in the media item including instructions for executing the neural network to process the media data and generate the particular rendering data output that can be displayed based on the description of the neural network.

2. The method of claim 1, wherein the neural network architecture comprises a set of filters, activation functions, and parameters implemented along a path of interconnected layers in the neural network architecture, wherein the parameters comprise weights associated with one or more of the interconnected layers.

3. The method of claim 2, wherein the description of the neural network comprises:
    connection information defining how the interconnected layers are connected to form the path of interconnected layers;
    input information defining how to form an input for the neural network based on the media data; and
    output information defining how to form an output from the neural network.

4. The method of claim 1, wherein the description of the neural network defines one or more customized tasks of the neural network, the one or more customized tasks comprising at least one of encoding the media data, decoding the media data, performing one or more compression operations on the media data, performing one or more image processing operations on the media data, performing a frame rate conversion operation, and performing an audio signal modification operation.

5. The method of claim 4, wherein the one or more image processing operations comprise at least one of an image restoration operation, an image enhancement operation, a filtering operation, a scaling operation, and an image rendering operation.

6. The method of claim 1, wherein the media item comprises a data file or a data stream, the method further comprising:
    embedding an additional rendering engine model in the media item, the additional rendering engine model comprising an additional description of an additional neural network configured to process the media data and generate a different rendering data output that can be displayed, the additional description defining a different neural network architecture for the additional neural network, the different neural network architecture being customized for a different operational outcome based on at least one of different layers, different filters, different activation functions, and different parameters defined for the different neural network architecture; and
    providing, to the one or more devices, the media item with the rendering engine model and the additional rendering engine model embedded in the media item.

7. The method of claim 6, further comprising:
    based on one of the rendering engine model or the additional rendering engine model, generating one of the neural network or the different neural network; and processing the media data using the one of the neural network or the different neural network to generate one of the rendering data output or the different rendering data output.

8. The method of claim 1, wherein the media data comprises raw media data from the data capturing device, wherein the data capturing device comprises at least one of an image capturing device, a video capturing device, and an audio capturing device.

9. The method of claim 1, further comprising:
embedding an additional rendering engine model in the media item, the additional rendering engine model comprising an address to a remote location of an additional description of an additional neural network configured to process the media data and generate a respective rendering data output that can be displayed, the additional description defining a respective neural network architecture for the additional neural network, the respective neural network architecture being customized for a respective operational outcome based on at least one of respective layers, respective filters, respective activation functions, and respective parameters defined for the respective neural network architecture; and
providing, to the one or more devices, the media item with the rendering engine model and the additional rendering engine model embedded in the media item.

10. The method of claim 9, further comprising:
retrieving, based on the address, the additional description of the additional neural network from the remote location;
based on the additional description of the additional neural network, generating the additional neural network; and
processing the media data using the additional neural network to generate the respective rendering data output, the respective rendering data output comprising rendered media data.

11. The method of claim 1, further comprising:
receiving the media item with the rendering engine model embedded in the media item;
based on the rendering engine model, generating the neural network; and
processing the media data in the media item using the neural network to generate the particular rendering data output, the particular rendering data output comprising rendered media data.

12. The method of claim 1, wherein providing the media item with the rendering engine model to the one or more devices comprises at least one of storing the media item with the rendering engine model on the one or more devices and sending the media item with the rendering engine model to the one or more devices.

13. An apparatus for providing a rendering engine model for raw media data, the apparatus comprising:
a memory; and
a processor configured to:
obtain media data captured by a data capturing device, the media data comprising at least one of image data, video data, and audio data;
insert the rendering engine model in a media item containing the media data, the rendering engine model comprising a description of a neural network configured to process the media data and generate a particular rendering data output that can be displayed, the description defining a neural network architecture for the neural network; and
output the media item with the rendering engine model embedded in the media item, the rendering engine model in the media item including instructions specifying how to execute the neural network to process the media data and generate the particular rendering data output that can be displayed based on the description of the neural network.

14. The apparatus of claim 13, wherein the neural network architecture comprises a set of filters, activation functions, and parameters implemented along a path of interconnected layers in the neural network architecture, wherein the parameters comprise weights associated with one or more of the interconnected layers.

15. The apparatus of claim 14, wherein the description of the neural network comprises:
connection information defining how the interconnected layers are connected to form the path of interconnected layers;
input information defining how to form an input for the neural network based on the media data; and
output information defining how to form an output from the neural network.

16. The apparatus of claim 13, wherein the description of the neural network defines one or more customized tasks of the neural network, the one or more customized tasks comprising at least one of encoding the media data, decoding the media data, performing one or more compression operations on the media data, performing one or more image processing operations on the media data, performing a frame rate conversion operation, and performing an audio signal modification operation.

17. The apparatus of claim 16, wherein the one or more image processing operations comprise at least one of an image restoration operation, an image enhancement operation, a filtering operation, a scaling operation, and an image rendering operation.

18. The apparatus of claim 13, wherein the media item comprises a data file or a data stream, wherein the processor is configured to:
insert an additional rendering engine model in the media item, the additional rendering engine model comprising an additional description of an additional neural network configured to process the media data and generate a different rendering data output that can be displayed, the additional description defining a different neural network architecture for the additional neural network, the different neural network architecture being customized for a different operational outcome based on at least one of different layers, different filters, different activation functions, and different parameters defined for the different neural network architecture; and
output the media item with the rendering engine model and the additional rendering engine model embedded in the media item.

19. The apparatus of claim 18, wherein the processor is configured to:
generate, based on one of the rendering engine model or the additional rendering engine model, one of the neural network or the different neural network; and
process the media data using the one of the neural network or the different neural network to generate one of the rendering data output or the different rendering data output.

20. The apparatus of claim 13, wherein the apparatus comprises at least one of a mobile device, the data capturing device, the one or more devices, and a display for displaying the particular rendering data output.

21. The apparatus of claim 13, wherein the processor is configured to:
  insert an additional rendering engine model in the media item, the additional rendering engine model comprising an address to a remote location of an additional description of an additional neural network configured to process the media data and generate a respective rendering data output that can be displayed, the additional description defining a respective neural network architecture for the additional neural network, the respective neural network architecture being customized for a respective operational outcome based on at least one of respective layers, respective filters, respective activation functions, and respective parameters defined for the respective neural network architecture; and
  output the media item with the rendering engine model and the additional rendering engine model embedded in the media item.

22. The apparatus of claim 21, wherein the processor is configured to:
  retrieve, based on the address, the additional description of the additional neural network from the remote location;
  based on the additional description of the additional neural network, generate the additional neural network; and
  process the media data using the additional neural network to generate the respective rendering data output, the respective rendering data output comprising rendered media data.

23. The apparatus of claim 13, wherein the processor is configured to:
  generate the neural network based on the rendering engine model in the media item; and
  process the media data in the media item using the neural network to generate the particular rendering data output, the particular rendering data output comprising rendered media data.

24. The apparatus of claim 13, wherein the apparatus comprises a mobile device.

25. The apparatus of claim 13, further comprising the data capturing device for capturing the media data.

26. The apparatus of claim 13, further comprising a display for displaying one or more images.

27. A non-transitory computer-readable storage medium for providing a rendering engine model for raw media data, the non-transitory computer-readable storage medium comprising:
  instructions stored therein which, when executed by one or more processors, cause the one or more processors to:
    obtain media data captured by a media data capturing device, the media data comprising at least one of image data, video data, and audio data;
    embed the rendering engine model in a media item containing the media data, the rendering engine model comprising a description of a neural network configured to process the media data and generate a particular rendering data output that can be displayed, the description defining a neural network architecture for the neural network; and
    output the media item with the rendering engine model embedded in the media item, the rendering engine model in the media item including instructions for executing the neural network to process the media data and generate the particular rendering data output that can be displayed based on the description of the neural network.

28. The non-transitory computer-readable storage medium of claim 27, wherein the neural network architecture comprises a set of filters, activation functions, and parameters implemented along a path of interconnected layers in the neural network architecture, wherein the parameters comprise weights associated with one or more of the interconnected layers.

29. The non-transitory computer-readable storage medium of claim 28, wherein the description of the neural network comprises:
  connection information defining how the interconnected layers are connected to form the path of interconnected layers;
  input information defining how to form an input for the neural network based on the media data; and
  output information defining how to form an output from the neural network.

30. The non-transitory computer-readable storage medium of claim 27, wherein the neural network is configured to perform one or more customized tasks comprising at least one of encoding the media data, decoding the media data, performing one or more compression operations on the media data, performing one or more image processing operations on the media data, performing a frame rate conversion operation, and performing an audio signal modification operation.

31. The non-transitory computer-readable storage medium of claim 27, storing additional instructions which, when executed by the one or more processors, cause the one or more processors to:
  embed an additional rendering engine model in the media item, the additional rendering engine model comprising an additional description of an additional neural network configured to process the media data and generate a different rendering data output that can be displayed, the additional description defining a different neural network architecture for the additional neural network, the different neural network architecture being customized for a different operational outcome based on at least one of different layers, different filters, different activation functions, and different parameters defined for the different neural network architecture; and
  output the media item with the rendering engine model and the additional rendering engine model embedded in the media item.

* * * * *